(12) United States Patent
Czyzewicz et al.

(10) Patent No.: US 8,495,212 B2
(45) Date of Patent: *Jul. 23, 2013

(54) INTERNET IDENTITY GRAPH AND SOCIAL GRAPH MANAGEMENT SYSTEM AND METHOD

(75) Inventors: Sara Czyzewicz, Pawtucket, RI (US); Arron Kallenberg, Providence, RI (US); Anthony Dimitre, Boulder, CO (US)

(73) Assignee: Olive Interactive, LLC, Providence, RI (US)

( * ) Notice: Subject to any disclaimer, the term of this patent is extended or adjusted under 35 U.S.C. 154(b) by 943 days.

This patent is subject to a terminal disclaimer.

(21) Appl. No.: 12/605,237

(22) Filed: Oct. 23, 2009

(65) Prior Publication Data

US 2010/0077048 A1 Mar. 25, 2010

Related U.S. Application Data

(63) Continuation-in-part of application No. 12/540,173, filed on Aug. 12, 2009, now Pat. No. 8,275,870.

(60) Provisional application No. 61/088,264, filed on Aug. 12, 2008.

(51) Int. Cl.
*G06F 15/173* (2006.01)
*G06F 21/00* (2006.01)
*G06F 7/04* (2006.01)

(52) U.S. Cl.
USPC ............. 709/225; 709/244; 713/182; 726/5

(58) Field of Classification Search
USPC ................. 709/225, 244; 713/182; 726/5
See application file for complete search history.

(56) References Cited

U.S. PATENT DOCUMENTS

| | | | |
|---|---|---|---|
| 7,797,413 B2 | 9/2010 | Adelman et al. | |
| 7,958,266 B1 | 6/2011 | Sun | |
| 2003/0037131 A1 | 2/2003 | Verma | |
| 2004/0073691 A1 | 4/2004 | Sun | |
| 2005/0246415 A1 | 11/2005 | Belfiore et al. | |
| 2006/0075224 A1* | 4/2006 | Tao | 713/164 |
| 2007/0156876 A1 | 7/2007 | Sundarrajan et al. | |
| 2007/0208869 A1* | 9/2007 | Adelman et al. | 709/229 |
| 2007/0208940 A1* | 9/2007 | Adelman et al. | 713/168 |
| 2007/0294431 A1* | 12/2007 | Adelman et al. | 709/245 |
| 2008/0071808 A1* | 3/2008 | Hardt et al. | 707/100 |
| 2008/0114867 A1* | 5/2008 | Thayer et al. | 709/223 |
| 2008/0114868 A1* | 5/2008 | Thayer et al. | 709/223 |
| 2008/0114869 A1* | 5/2008 | Thayer et al. | 709/223 |
| 2008/0133735 A1* | 6/2008 | Thayer et al. | 709/223 |
| 2008/0222425 A1* | 9/2008 | Buss | 713/185 |
| 2008/0301290 A1 | 12/2008 | Ahmed et al. | |
| 2010/0049790 A1 | 2/2010 | Schreiber | |
| 2010/0153862 A1 | 6/2010 | Schreiber | |

OTHER PUBLICATIONS

Fitzpatrick et al.; "Thoughts on the Social Graph"; http://bradfitz.com/social-graph-problem/; Nov. 11, 2009; 7 pages.

* cited by examiner

*Primary Examiner* — Ranodhi Serrao
(74) *Attorney, Agent, or Firm* — Patton Boggs LLP

(57) ABSTRACT

A server computer provides to a client computer a web page permitting an internet user to enter an internet identity to be secured. The server receives an input indicating that an internet user has entered an identity and requested that the identity be secured on a plurality of web sites. The internet identity is registered on the plurality of web sites and the registration is verified to said internet user.

2 Claims, 32 Drawing Sheets

FIG. 5 return_services  ⟵152

Returns a list of a services associated with a specific user.

This call is great if you want to learn more about a particular user's other online services (e.g. twitter, digg, del.icio.us, etc.). Lookup is done via email address, so integration with your existing users is a snap (provided they opt-in to dandyId -- we don't return anything without the user's permission).

Request URL: GET  ⟵156 http://www.dandyId.org/api/return_services/{api_key}/{user_identifier}
                                              ⟵157         ⟵158

GET Request parameters  ⟵160

| Parameter | Type | Description |
|---|---|---|
| api_key | string (required) | Your api key |
| user_identifier | string (required) | Can be either an email address or dandyId user id |

Values Returned as XML  ⟵170

| Parameter | Type | Description |
|---|---|---|
| svcId | string | Id of the service on dandyId (one word all lowercase). |
| svcName | string | Displayable name of the service, (use this to output to users, not svcId). |
| usrSvcId | string | Unique identifier of the user for corresponding service. |
| url | string | Url to the user's public profile on the corresponding service. |

FIG. 6  ⟋200

Sample Response  ⟋202

```xml
<?xml version="1.0" encoding="iso-8859-1"?>
  <services>  ←204
205 <service>  ←206
   <svcId>digg</svcId>  ←208
   <svcName>Digg</svcName>  ←210
   <usrSvcId>kallena</usrSvcId>  ←212
   <url>www.digg.com/kallena</url>  ←214
  </service>  ←215
  <service>  ←216
   <svcId>flickr</svcId>
   <svcName>Flickr</svcName>      ⟋221
220 <usrSvcId>arronkallenberg</usrSvcId>
   <url>http://flickr.com/photos/arronkallenberg</url>
  </service>
  <service>
   <svcId>youtube</svcId>
222 <svcName>Youtube</svcName>
   <usrSvcId>kallenarron</usrSvcId>
   <url>http://youtube.com/user/kallenarron</ur>
  </service>
  <service>
   <svcId>tumblr</svcId>
   <svcName>Tumblr</svcName>
   <usrSvcId>kallena</usrSvcId>
   <url>http://kallena.tumblr.com</url>
  </service>
  <service>
   <svcId>pownce</svcId>
   <svcName>Pownce</svcName>
   <usrSvcId>kallena</usrSvcId>
   <url>http://pownce.com/kallena</url>
  </service>
  <service>
   <svcId>delicious</svcId>
   <svcName>Delicious</svcName>
   <usrSvcId>kallena</usrSvcId>
   <url>http://del.icio.us/kallena</url>
  </service>
  <service>
   <svcId>pandora</svcId>
   <svcName>Pandora</svcName>
   <usrSvcId>arron5</usrSvcId>
   <url>http://www.pandora.com/people/arron5</url>
  </service>

<service>
   <svcId>plaxo</svcId>
   <svcName>Plaxo</svcName>
   <usrSvcId>arronkallenberg</usrSvcId>
   <url>http://arronkallenberg.myplaxo.com/</url>
  </service>
  <service>
   <svcId>linkedin</svcId>
   <svcName>Linkedin</svcName>
   <usrSvcId>arronkallenberg</usrSvcId>
   <url>http://www.linkedin.com/in/arronkallenberg</url>
  </service>
  <service>
   <svcId>myspace</svcId>
   <svcName>Myspace</svcName>
   <usrSvcId>arronkallenberg</usrSvcId>
   <url>http://www.myspace.com/arronkallenberg</url>
  </service>
  <service>
   <svcId>twitter</svcId>
   <svcName>Twitter</svcName>
   <usrSvcId>kallena</usrSvcId>
   <url>http://twitter.com/kallena</url>
  </service>
  <service>
   <svcId>bluedot</svcId> ~      ⟋234
   <svcName>Bluedot</svcName>
   <usrSvcId>kallena</usrSvcId>
   <url>http://faves.com/users/</url>
  </service>←236
</services>←238

Signup for dandyID!
Sign up and start sharing your complete online identity!

- First Name: ⬚ ~304
- Last Name: ⬚ ~306
- Password: ⬚ ~308
- Re-type Password: ⬚ ~310
- E-mail: ⬚ ~312
- Re-type E-mail: ⬚ ~314
- How'd u hear about us? ⬚ ~316

[ SUBMIT ▶ ]~318

Request API Key? ☑~320

322 → If you are a developer, service website or app that would like to obtain an API key, please check the box -- you will be required to provide us with additional information. If you have no idea what an API key is, don't worry about it.

330 ↘

- Product Name: ⬚ ~332
  *Users will see your product name when they manage their permissions.*
- Url: ⬚ ~334
  *Users will also be given access to this url.*
- Phone: ⬚ ~336
  *Users will not be given access to your phone number.*
- Description: ⬚ ~340
  *Describe your service in 250 charactes or less. This will allow us to approve your service, user will not see this information.*

250 ←342

[ SUBMIT ▶ ]
            ↳342

350 ↘

| Home | Signup | Contact | FAQ | API Documentation | Stats | Blog | Careers |

FIG. 22

DandyID 🏠      PRO Sarah Smith   settings   logout

View my Profile

Personal Stats

☒ In Box

👤 My Profile   edit

👥 My Identities   edit

👤 My Contacts   edit

⇄ Share

~ Analytics

Personal Stats
     Social Analytics
     Contact Updates

⚙ My API Profile

---

Service Stats — 1033
See a breakdown of your sevices based on the number of times someone has clicked through to one of them

Site Stats — 1035
See a breakdown of the sites where you've shard your identity that are driving traffic to your services — 1061

Users — 1037
See other DandyID users who have clicked through to view one or more or your services Last 24 hrs   7 Days   30 Days   365 Days   All Time — 1068

1062   1064
87.5% ▓▓▓▓▓▓▓▓▓▓
8.25% ▓
8.25% ▓

1066 →
www.dandyid.org
www.facebook.com
www.TheMissSmithWebsite.com

| ClaimMyName |
|---|

Choose your Package ← 1452

```
┌─────────────────┐   ┌─────────────────┐
│   Starter Pack  │   │    Pro Pack     │
│   30 Services   │   │   300 Services  │
│      $329       │   │      $799       │
└─────────────────┘   └─────────────────┘
        1453                  1454
```

Choose your Services ← 1455

Please select the service that you'd like DandyID to register for you.

30 popular services have been preselected for you. However, you may customize your selection below.

30 of 30 selected          1457   1458   1456

| ☑ Twitter | ☑ Facebook | ☑ YouTube | ☑ Flickr |
| ☑ Linkedin | ☑ Delicious | ☑ MySpace | ☑ Digg |
| ☑ last.fm | ☑ Friendfeed | ☑ Blogger | ☑ Stumbleupon |
| ☑ Google Reader | ☑ Technorati | ☑ Google Profiles | ☑ Brightkite |

1459

Choose your Username ← 1460

| Notes to User: | 1461 |

We suggest using variants of your full name. e.g., jonnysmith. jonny_smith. jonnysmithjr, etc.
Note: Some sites require usernames to be 4-15 characters

Basic Information ← 1470

The information below is required in order to register you on most services.

1472

NOTE: If we need additional information, we will first attempt to pull it from your DandyID profile. If your DandyID profile does not have the information we need, we will email you at user@ISP.net

USER IDENTIFICATION:
xxxxxxxxxxxxxx
xxxxxxxxxxxxxx
xxxxxxxxxxxxxx

← 1478

Pro Pack PLUS — 1480

— 1482
☐ Add PLUS to my order - $450
PLUS is an additional option for the Pro Pack: Add your website URL and bio to each of the 300 services registered.

Short Bio (one sentence): [_____] — 1484

Long Bio: [_____]

1486

URL: [_____] — 1488

Legal Requirements — 1490
— 1491
☐ I attest that I am the owner or authorized representative of the names to be claimed above.
— 1493
☐ I have read, understand and agree to the terms of Use, Terms of Service and/or Privacy Policy of each service that I've selected above; and, furthermore, I hereby authorize DandyID (Olive Interactive, LLC) to act on my behalf on each of these services.

[ Proceed to Checkout ] — 1495

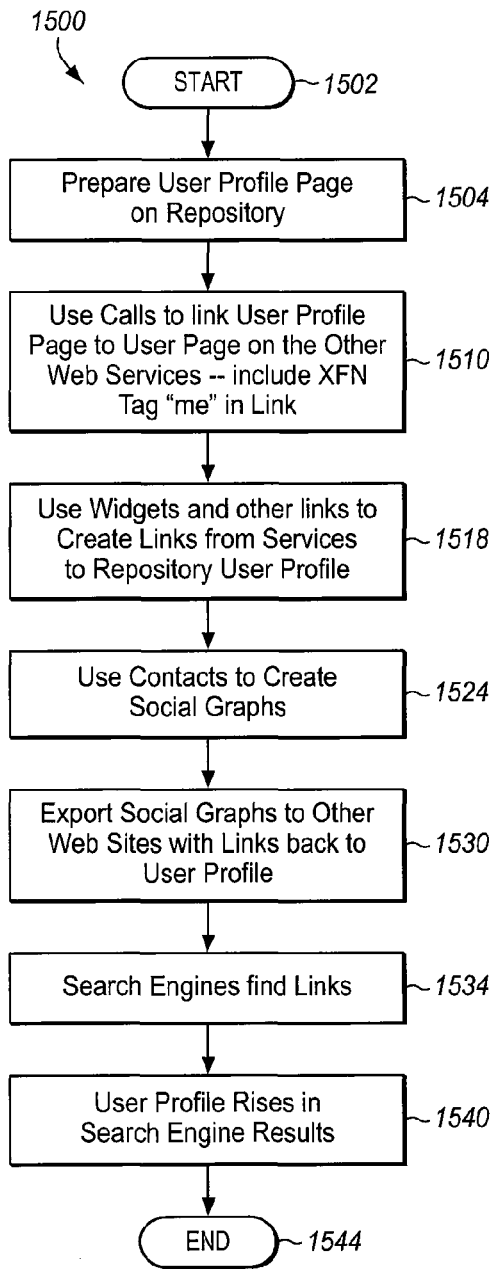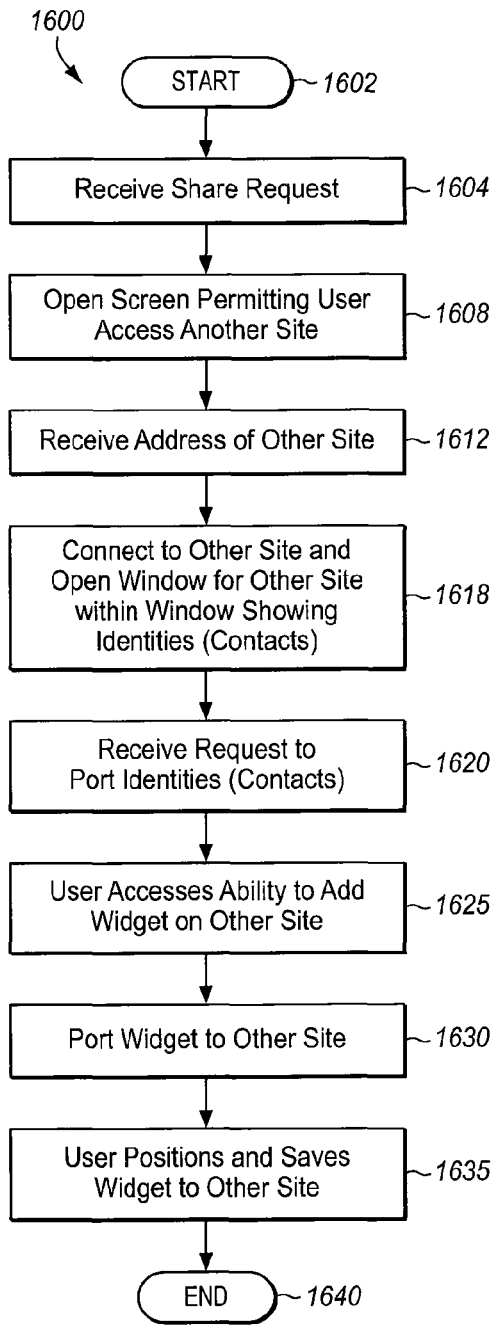

INTERNET IDENTITY GRAPH AND SOCIAL GRAPH MANAGEMENT SYSTEM AND METHOD

CROSS-REFERENCE TO RELATED APPLICATIONS

This application is a continuation-in-part of U.S. patent application Ser. No. 12/540,173 filed Aug. 12, 2009, which claims the benefit of U.S. Provisional Application No. 61/088,264 filed Aug. 12, 2008.

BACKGROUND OF THE INVENTION

1. Field of the Invention

The invention relates generally to the field of social web sites on global computer networks and in particular to a system and method for managing information personal to individual users of social web sites.

2. Statement of the Problem

The Internet started as an information source and communication tool, and these functions remain important aspects of the Internet. It is also a truism that the Internet is a powerful sales tool. Companies that provide useful internet services have cash flows of more then ten billion dollars a year, much of which comes from advertising. The Internet has become the most important medium for distribution of music, and is rapidly becoming the most important medium for distribution of videos. The Internet has also become an important vehicle for telecommunications, including telephone communication. Because the Internet lends itself to immediate feedback to advertisers and service providers, new Internet uses, such as directed advertising are rapidly evolving.

The Internet has also grown to become an important social network. From one point of view, the Internet is the largest social network on the planet. Moreover, on a more explicit level, there are scores, if not hundreds of social network sites on the Internet, and millions of blogs. Social network sites are defined as web sites or applications that provide people with designated relationships to each other access to information that is not available to others who do not have such designated relationships. Because the Internet can be accessed from a myriad of points, such as desktop computers connected to wires, laptop computers connected to wireless networks, hand-helds, cell phones, and integrated products such as Ipods™, for many individuals, the Internet has become their primary means of communication. The explicit social web sites encourage individuals to share their ideas, experiences and thoughts with their friends, sometimes on an hourly or more frequent basis. These social web sites are uniquely different from conventional informational and shopping web sites in that they provide interactions between the web site users, and not just between the web site and individual users. The actions on these web sites are more complex, including actions such as adding a contact, deleting a contact, sending a message to a contact, inviting, such as to a social event, blocking, staring, which also is called bookmarking or placemarking, depending on the web site, linking as in assigning an attribute or giving credit, set a trust level, and voting.

The Internet permits individuals to live in many different social circles that would not be available without the Internet. However, it also creates problems in that it is difficult to control identities on the internet. A person may select an identity, and find that the identity may be taken by another. An even greater problem is created by the fact that after an individual or company registers an identity on one site, others may intentionally usurp that identity on another site. The proliferation of sites makes it difficult for an individual or company to capture an identity on all sites.

All of the above problems are particularly exacerbated in social network sites. The key purpose of such sites is social networking, and if a user's identity is not known or varies, such social networking becomes difficult to impossible. Moreover, reconnecting among friends on new social network sites is laborious and thus seriously impedes social networking.

For the above and other reasons, it would be highly desirable if a method and apparatus were available that allowed an individual, corporation or other entity to better control their identities on the internet.

SUMMARY OF THE INVENTION

The invention solves the above problems, as well as other problems of the prior art, by providing a global Internet identity repository and management system. Preferably, the internet identity management system permits the user to register an internet identity, sometimes referred to herein as "username", on a plurality of websites. The system of the invention will register the user on three hundred or more websites, by filling out information on a single web page. The system also allows the user to easily check to see if their internet identity is already registered on specific web sites.

The invention provides a method of securing an internet identity on a plurality of web sites, the method comprising: providing a web page permitting an internet user to enter the internet identity to be secured; receiving an input indicating that an internet user has entered an identity and requested that the identity be secured on the plurality of web sites; registering the internet identity on the plurality of web sites; and verifying to the internet user that the identity has been registered on the plurality of web sites. Preferably, the providing a web page further comprises providing a web page that permits the user to enter a website URL, and the registering further comprises adding the URL to the plurality of websites. Preferably, the registering further comprises enter a link back to the URL on the plurality of web sites. Preferably, the providing a web page further comprises providing a web page that permits the user to enter a user biography, and the registering further comprises adding the biography to the plurality of websites. Preferably, the providing a web page comprises providing a web page permitting an internet user to enter variants of the internet identity to be secured. Preferably, the providing a web page further comprises providing a web site showing a list of possible web sites on which the internet identity may be secured, and the receiving an input comprises receiving a signal that one or more of the possible web sites have been indicated. Preferably, the providing a list comprises displaying a plurality of icons, each icon representing a different web site on which the internet identity may be secured. Preferably, the providing a web page further comprises providing a web page that permits the internet user to select the number of web sites on which the internet identity is to be secured. Preferably, the providing a web page further comprises providing a web page permitting the internet user to order the registering on a recurring basis. Preferably, the verifying comprises sending an email to an email address. Preferably, the providing a web page comprises providing a web page on which the internet user may pay for the securing service. Preferably, the providing a web page comprises providing a web page offering a plurality of different payments for the securing services, with the number of the web sites on which the internet identity is secured being different for each of the plurality of different payments. Preferably, the providing a web page further comprises providing a web page on which the user may attest the user has the right to the internet identity to be secured.

The invention also provides a method for permitting an internet user to discovering web sites on which a user identifier is registered, the method comprising: using a server computer, providing on a client computer remote from the server computer, a display of a web page permitting an internet user to enter an identifier the user desires to check for registration on a web site, wherein the web site to be checked is not the web site associated with the server computer; receiving at the server computer an input indicating the user has entered an identifier to be checked and requesting that the identifier be checked on at least one web site; and in response to the input, going out to the at least one web site and checking if the identifier is in use on the web site; and indicating on the client computer that the identifier is registered on the web site. Preferably, the providing a display on the client computer comprises providing a display showing a plurality of icons, each icon representing a different web site; and the receiving an input comprises receiving a signal that the user has clicked on one of the icons. Preferably, the method further comprises recording the web sites on which the identifier is registered.

In a further aspect, the invention provides a system for permitting an internet user to discovering web sites on which a user identifier is registered, the system comprising: a computer readable medium embodying instructions for directing a first processing unit to: provide a display of a web page permitting the internet user to enter an identifier the user desires to check for registration on a web site, wherein the web site to be checked is not the web site associated with the first processing unit; receive an input indicating the user has entered an identifier to be checked and requesting that the identifier be checked on at least one web site; and in response to the input, going out to the at least one web site and checking if the identifier is in use on the web site; and provide a display indicating that the identifier is registered on the web site. Preferably, the instructions further include instructions for directing the first processing unit to provide a display showing a plurality of icons, each icon representing a different web site; and the receiving an input comprises receiving a signal that the user has clicked on one of the icons. Preferably, the instructions for directing further comprise instructions for directing the first processing unit to record the web sites on which the identifier is registered.

The invention not only provides a method and apparatus for creating a repository for identity graphs and social graphs without any laborious entering of information, but also provides a method and apparatus for allowing users—and third parties on the users' behalf—to manage, distribute, discover and synchronize their identity information and subsequent social connections online. Numerous other features, objects, and advantages of the invention will become apparent from the following description when read in conjunction with the accompanying drawings.

BRIEF DESCRIPTION OF THE DRAWINGS

FIG. 5 illustrates a preferred embodiment according to the invention of an API call to obtain an identity graph of an Internet user;

FIG. 6 illustrates a preferred embodiment of the response to the call of FIG. 5 for an Internet user with a plurality of identities;

FIG. 8 is an exemplary embodiment of a signup page for an internet user, a web site or an application to register to utilize the system according to the invention;

FIG. 22 illustrates a preferred embodiment according to the invention of a Service Verification page;

FIG. 24 illustrates a preferred embodiment according to the invention of a Personal Stats-Site Stats page of the repository;

FIG. 26 illustrates a preferred embodiment according to the invention of a page showing a user's contacts at another web site;

FIGS. 29A and 29B show a web page useful for securing internet identities across a plurality of web sites.

FIG. 30 is a flow chart illustrating a preferred process according to the invention for creating linked identities on system 10 to increase search engine visibility; and FIG. 31 is a flow chart illustrating a preferred process according to the invention for porting identities or contacts to another web site.

DETAILED DESCRIPTION OF THE PREFERRED EMBODIMENT

Figure 1:
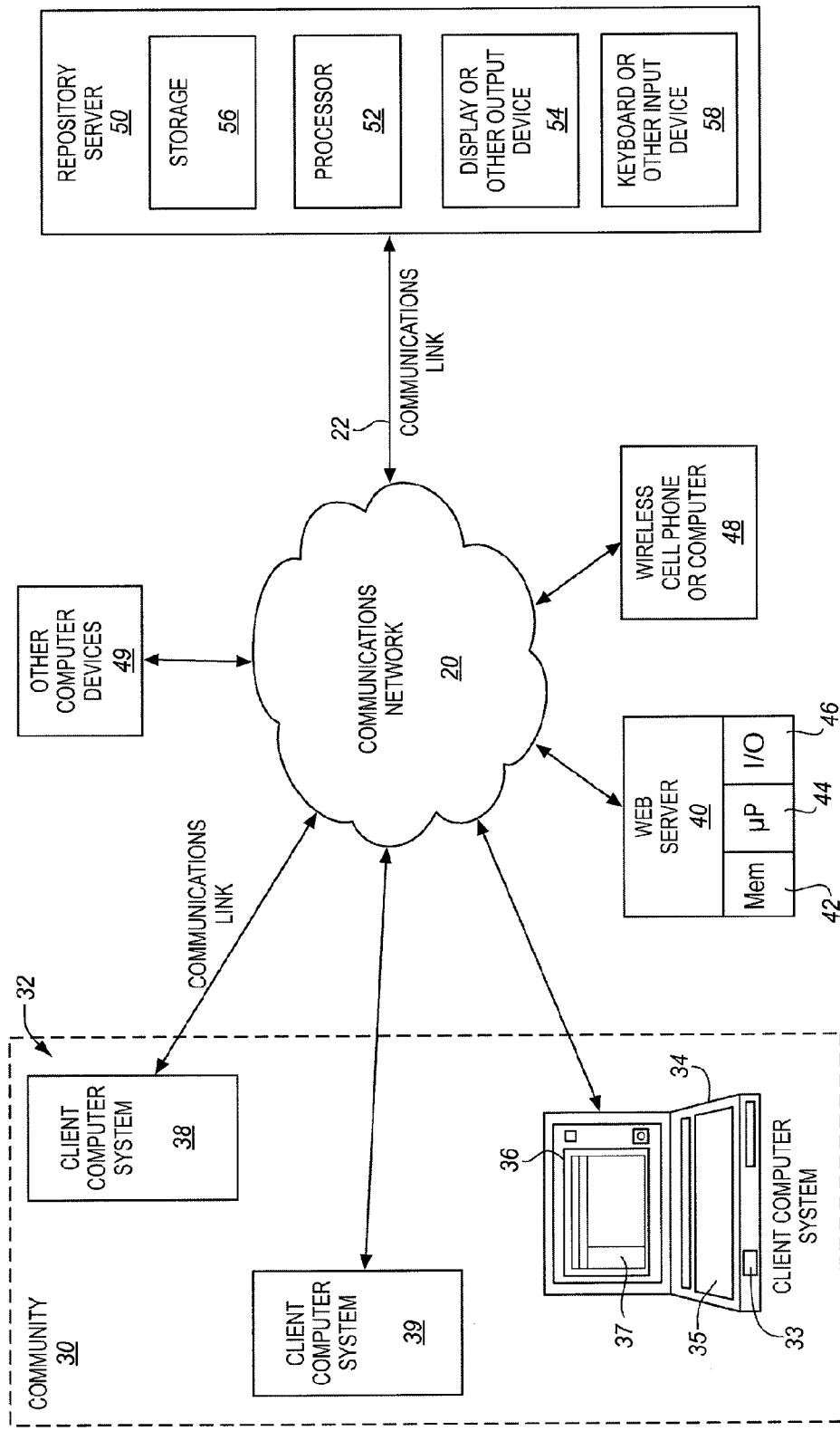
FIG. 1 is a block diagram of a preferred embodiment of a system according to the invention.

This disclosure describes a repository and distribution system 10 (FIGS. 1 and 2) for collecting users' online identities, and allowing them to be discovered, retrieved and/or updated through a central access point 50 by third parties 60, 62 and 64 and other users 34, 36, 38. The system also includes collection, discovery and distribution of a user's social graph 99, that is, the user's connections and communities on sites and applications throughout the web (see, FIG. 3). The system further includes user-set permissions (see below) for access, management and sharing of the user's information. The system also provides analytics, statistics and normalization for operations and data relating to users' behaviors throughout the web (see FIGS. 2, 17, 18, and 20). Thus, the system lends itself to web service or application recommendations and advertising decisions based on the collected identity graphs (IGs), social graphs (SGs) and statistics.

It should be understood that in this disclosure the term "web site" also means "web service" and "application". The term "application" means a software application that connects to the internet. While we shall try to use the terms web site, web service and application throughout this disclosure, it should be understood that the use of one includes the others. It should also be understood that the system described herein is currently in the state of development, and those skilled in the art will recognized that many of the elements will be changed in further development iterations. For example, to accelerate the pace of development, software shortcuts are sometimes taken. Thus, it should be recognized that the disclosure is not meant to limit the application, but is intended to be exemplary. It is expected that those skilled in the art will be able to create many variations and more sophisticated versions of the application.

FIG. 1 is a block diagram of an Internet identity repository management system 10 according to the invention from a hardware perspective. System 10 includes an internet communications network 20, a plurality of client computer systems 34, 38, and 39, a plurality of various computers 40, 48, and 49, which may take many different forms, such as a web server 40, a wireless device 48, such as a cell phone or wireless computer, or any other computer device 49, and a repository management computer 50, which is preferably a server. The various computers 34, 38, 39, 40, 48, 49 and 50 all communicate with one an other via communication links, such as 22, and the internet 20. Each client computer 34, 38, 39 includes an electronic processor 33, input device 35, such as a keyboard, an output device 36, such as a display, and a management tool, such as 37, useful for communicating with the server 50 via the network 20. Each of the computers 40 or 48 include a memory 42, a microprocessor 44 and an input/output device 46. The client computers 34, 38, and 39 form a community 32 of computers, in that, in the preferred embodiment, the users of these computers communicate with one another via at least one social web site. Repository management server 50 includes an electronic processor 52, one or more electronic storage devices, 56, such as a hard drive, a RAM, a ROM, tape, removable discs or drives, etc., one or more output devices 54, such as a display, printer or other output, and an input device 58, such as a keyboard, touch screen, mouse etc.

Figure 2:
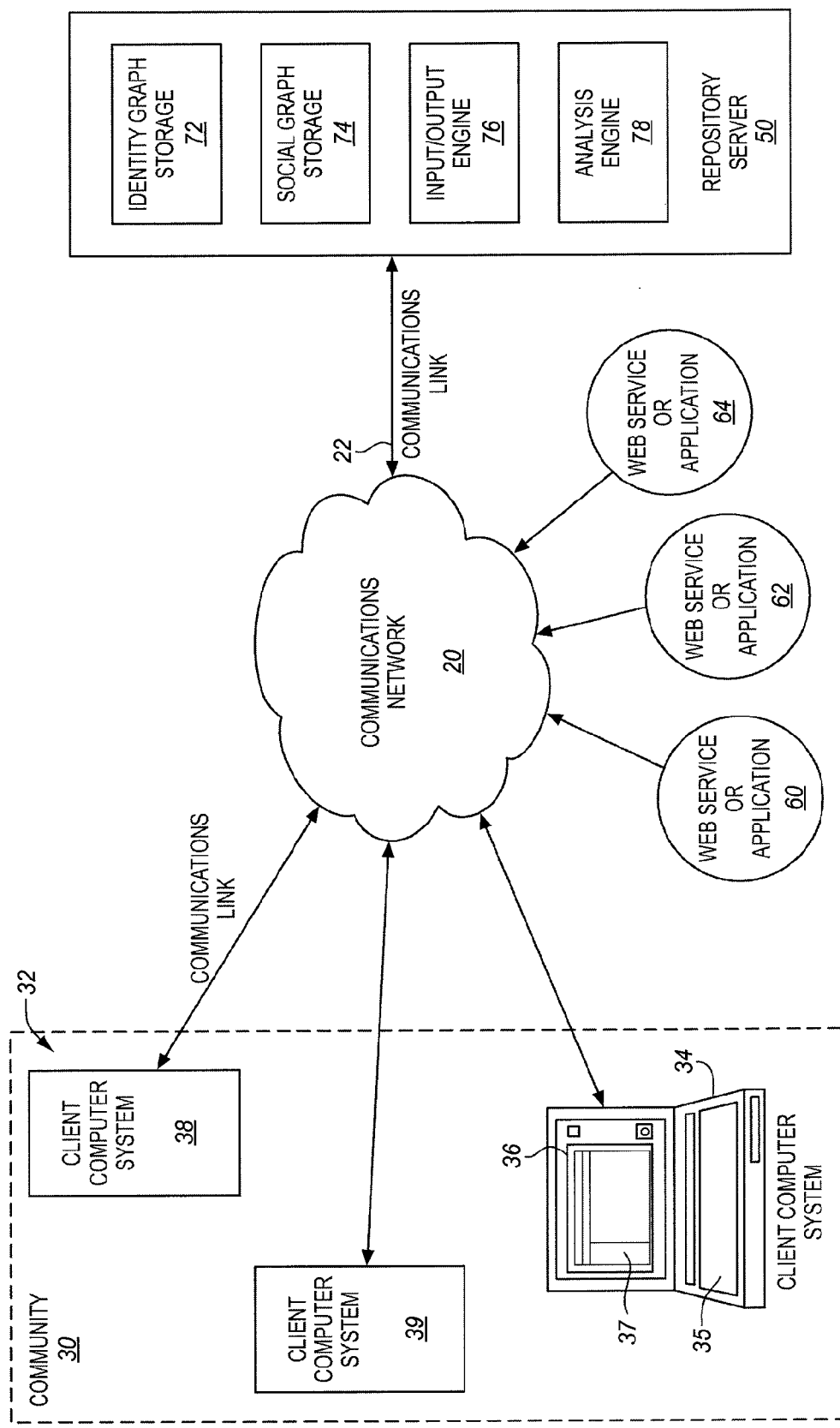
FIG. 2 is a block diagram of the system of FIG. 1 illustrating a preferred embodiment of the various software engines embodied in the invention.

FIG. 2 illustrates the system 10 according to the invention from another perspective, the perspective of the communication tools that form one aspect of the invention. In this aspect, the fact that each of the computers 40, 48, and 49 shown in FIG. 1 include a web service or application, 60, 62 and 64, and the repository management system 50 includes identity graph storage 72, social graph storage 74, and input/output engine 76 for communicating with the web services or applications 60, 62 and 64, and an analysis engine 18 for analyzing and providing valuable statistics based on the identity graphs and social graphs stored in 72 and 74 is emphasized. An important aspect of the invention is that the identity and social graph information stored in 72 and 74 may be obtained directly from and by the web services or applications 60, 62 and 64 very efficiently, eliminating a lot of the drudgery that the prior art has associated with a the daunting task of creating identity graphs and social graphs, for millions or even billions of internet users. We shall describe how this is done in detail below.

Figure 3:
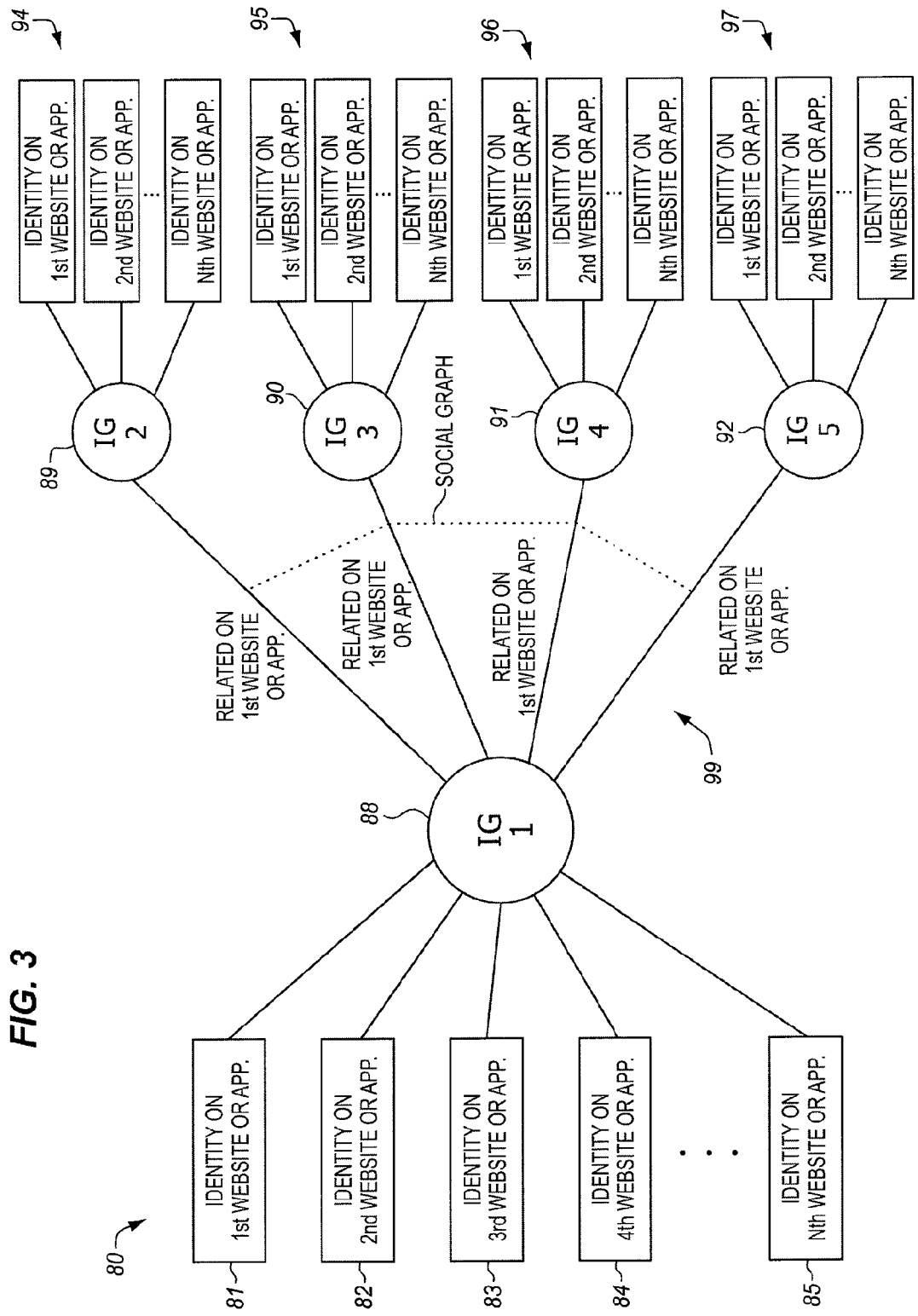
FIG. 3 is a block diagram illustrating a preferred embodiment of identity graphs and a social graph according to the invention.

Turning now to FIG. 3, one embodiment of a collection 80 of identity graphs 88, 89, 90, 91 and 92 are shown. The user represented by identity graph 88 has identities on n web sites or applications 81 through 85. The specific name the user has on each web site or application may be the same or different. However, even if the names are the same, each web site or application can result in a different identity, since the fact that that person is associated with a particular web site is preferably part of the identity graph. These identities are collected by the system 10 of the invention into the identity graph 88. Each of the users represented by identity graphs 89, 90, 91 and 92 has identities 94, 95, 96, 97, respectively, on m, p, q, and r, respectively, different web services or applications, and these identities are collected into identity graphs, 89, 90, 91, and 92, respectively. The users represented by identity graphs 89, 90, 91 and 92 have relationships 99 with the user represented by IG 88 on a first web site or application. These relationships 99 form a part of the social graph 86 of the user with identity graph 88. They also will form part of the social graph of each of the users with IG's 89 through 92, though this is not specifically indicated in the figure.

Figure 4:
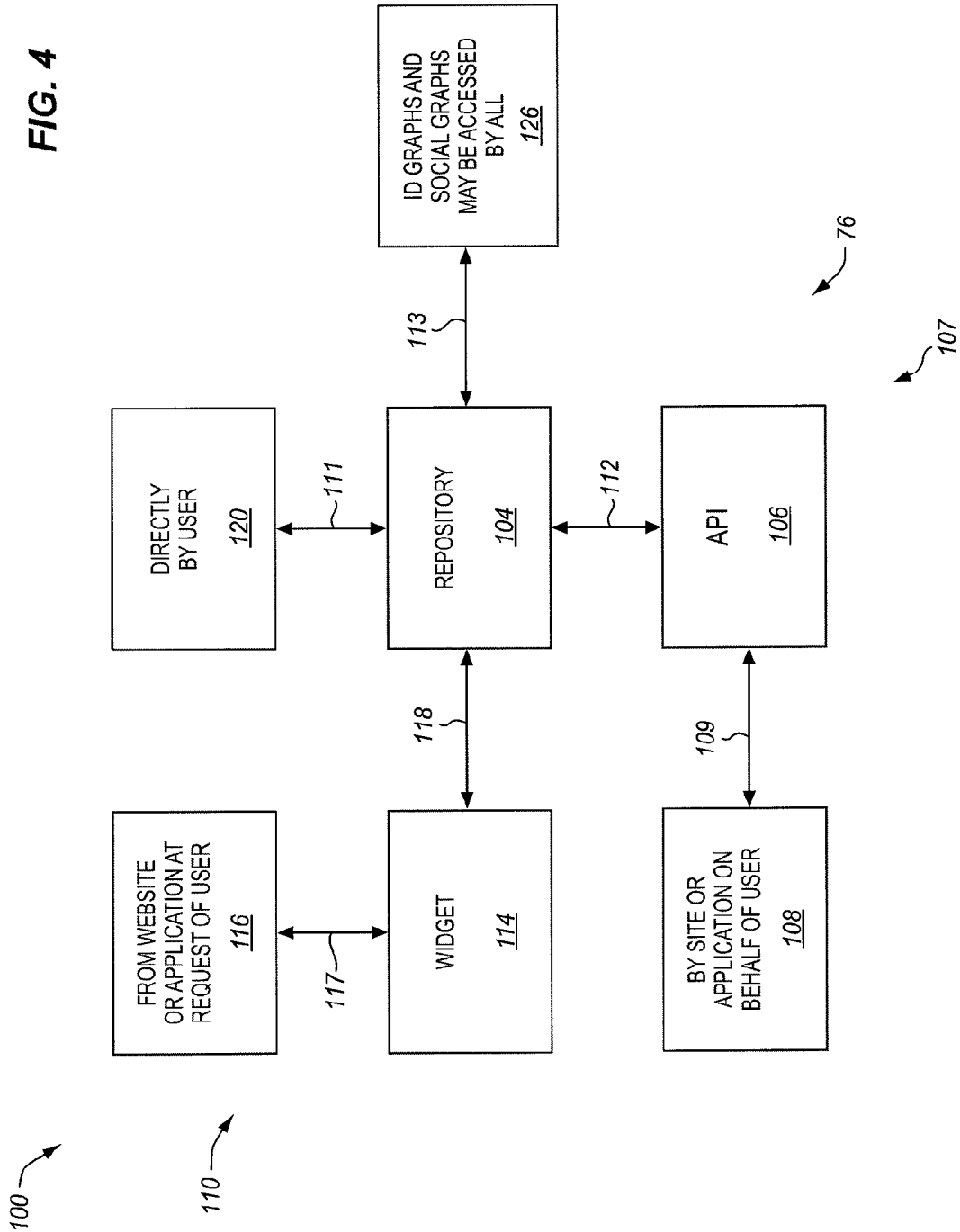
FIG. 4 is a flow chart illustrating a preferred embodiment of a method of collecting identity graphs and social graphs and maintaining an identity graph/social graph repository according to the invention.

FIG. 4 is a flow chart illustrating the preferred embodiment of a method according to the invention of collecting identity graphs and social graphs and maintaining an identity graph/social graph repository 104. The flow chart illustrates four different communication links 107, 110, 111 and 113 by which IG and SG information may be communicated to the repository 104. It is a feature of the invention that the variety of different ways that the IG and SG information may be collected via input/output engine 76 lends itself to ease and rapidity of collection. One preferred method 107 of collecting IG and SB information is directly from a web site or application 108 through an application programming interface (API) 106. As will be described below, the API associated with the repository passes the information to the site or application and the site uses the API to pass information to the repository. Using the API, which will be describe more completely below, a web site or application may automatically download IG and SG information to repository 104 for each user, and update it each time IG or SG information changes. In one embodiment, the information is not shared by Repository 104 with users other than the site that provided it unless or until the user to which the information pertains has granted permission for such a download. Generally, the only action required of the user is to check a permissions box associated with the web site or application. Often the user may check one box on the system 10, or confirm in some other manner, and grant permission for all web sites and applications that use the API system. This may include several hundred or thousands of individual items of IG and SG information that are collected simply by checking a single box.

Another way the IG and SG information may be collected by repository 104 is to, at the request of the user, go to the various web sites and applications 116 on which the user has an identity, and retrieve the information. The system provides a widget 114, which shall be describe below, and, simply by clicking on an icon for the web site or application, the user can use the widget to retrieve information as the user desires. A third way that the system may collect IG or SG information is for the user 120 to enter the information directly via link 111. With permission of the user, the system 10 according to the invention also enables the sharing of the information in repository 104 with any interested third party 126. This will also be described below. This sharing through link 113 provides an additional method for IG or SG information to be passed to repository 104. Whenever shared information is updated by a third party, this updated information may be transferred back to the repository. In addition, the sharing function encourages third parties to sign up on the system and thus enhances the collection of information.

Figure 21:
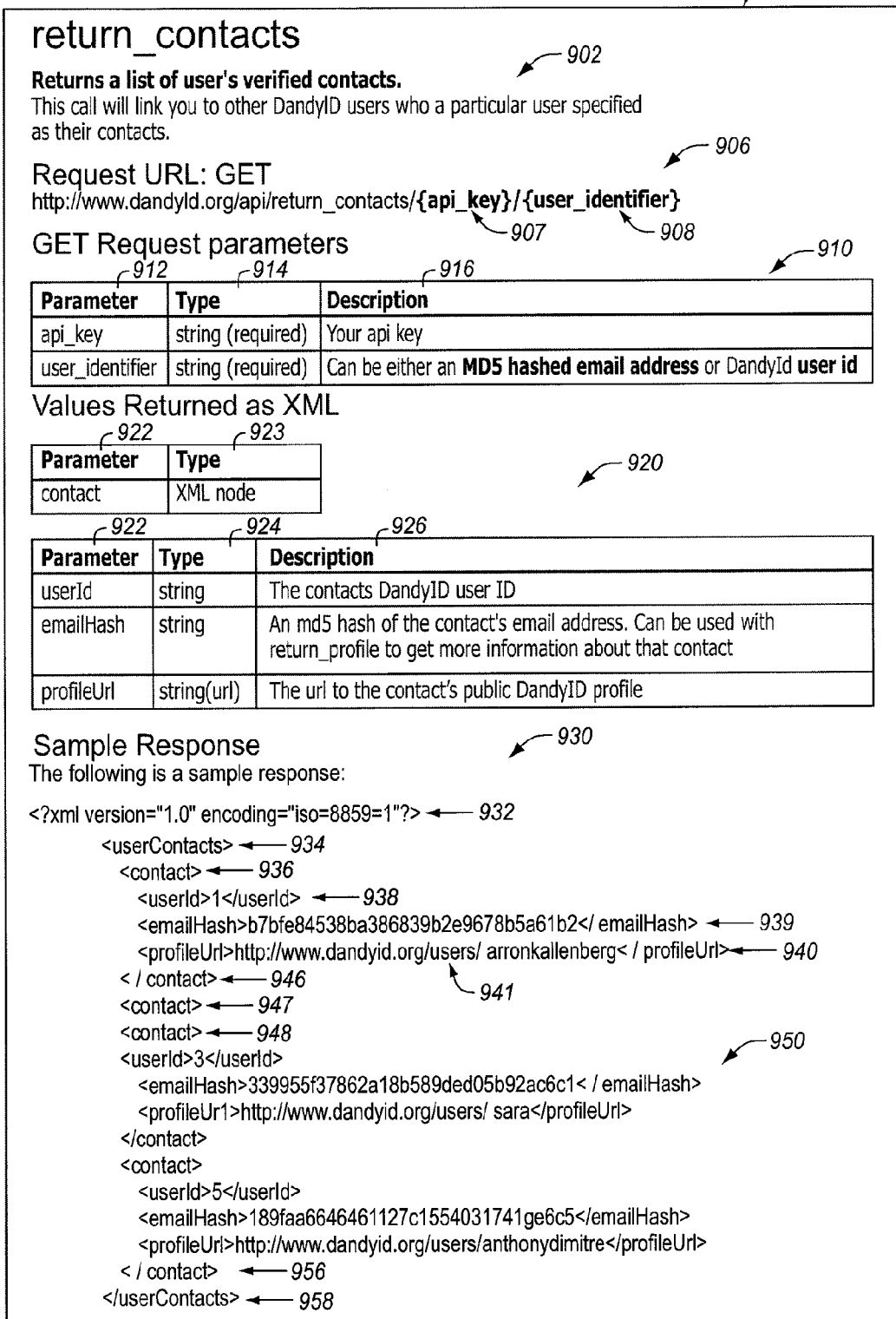
FIG. 21 illustrates a preferred embodiment according to the invention of an API call to get a list of a user's verified contacts.

Turning to FIGS. 5, 6, 7, 8, and 21 there is shown exemplary documentation describing a portion of the method in which third party web services and applications 60, 62, and 64 may interact with the repository 50. FIG. 21 is shown out of order because the call function for contacts could be completed only after much of the other software was developed. Specifically, FIGS. 5, 6, 7, 8 and 21 describe how a third party web service or application can obtain an API key and pull IG/SG information from the repository and push IG/SG information into the repository. FIG. 5 illustrates a preferred embodiment according to the invention of documentation 150 of an API call to obtain an identity graph of an Internet user. The documentation 150 first describes the usefulness of the call, i.e., to learn more about a particular user's other on line services, and explains that the lookup is preferably done via an email address. However, lookups can also be done via other identifiers, particularly if the user requests it. It also notes that the system does not return anything without the user's permission, which is provided via a permissions page (see below) or otherwise, such as through the web service via the API or via the widget described below. The GET is shown at 156. The get directs the call to the system web site services engine and indicates at 157 that the request must include an API key and at 158 that it must include a user identifier. The GET request parameters are described at 160 and include a parameter column 162, a type column 164, and a description column 166. As indicated, both the API key and the user identifier are preferably strings. We shall discuss below how the caller gets an API key and user identifier and the preferred form of the API key and the user identifier.

The documentation 150 describes the values returned by the call 156 at 170, which description includes a parameter column 172, a type column 174 and a description column 176. All the parameters are preferably strings. The first parameter returned, svcid, is the ID of the service in the repository 50. The second parameter svcName, is the displayable name of the web service, and is used to output information to users. The fourth parameter returned, usrSvcid, is the unique identifier of the user on the particular web service. As we will see below, the user can specify this. The last parameter returned, URL, is the URL to the user's public portfolio on the particular service.

FIG. 6 illustrates a preferred embodiment of the response 200 to the call of FIG. 5 for an Internet user with a plurality of identities. The response shown is in conventional XML notation but could be returned in any other data format as well. The first line 204 indicates that the services are to be listed. The return for each service begins with the service return start indication at 206 and ends with the service return end indication at 215. The first listing 205 on this particular response is for the well-known website "Digg". At 208 the listing indicates that the ID in the repository 50 is "digg". At 210 the listing indicates that the displayable name is "Digg", at 212 the listing indicates that the unique identifier for the user on the web service "Digg" is "kallena", and at 214 indicates that the URL for the user's public page on "Digg" is "www.Digg.com/kallena". After the service return end indication at 214, a new service return is start is indicated at 216. The next return is for the web service "Flickr". As can be seen at 221, the user has a different identifier on "Flickr", which identifier is "arronkallenberg". The next return 222 is for "YouTube", and the user's identifier on "YouTube" is kallenarron. Based on the above, the rest of the return should be understandable. In FIG. 6, for clarity, the return is shown in two columns connected by the arrow 230, though in the actual return, the entire return will preferably be in one continuous column. The last web service returned at 234 is for "Bluedot". This return ends with the end indication at 236, and then the completion of the return is indicated by the "services" closing at 238.

Figure 7:
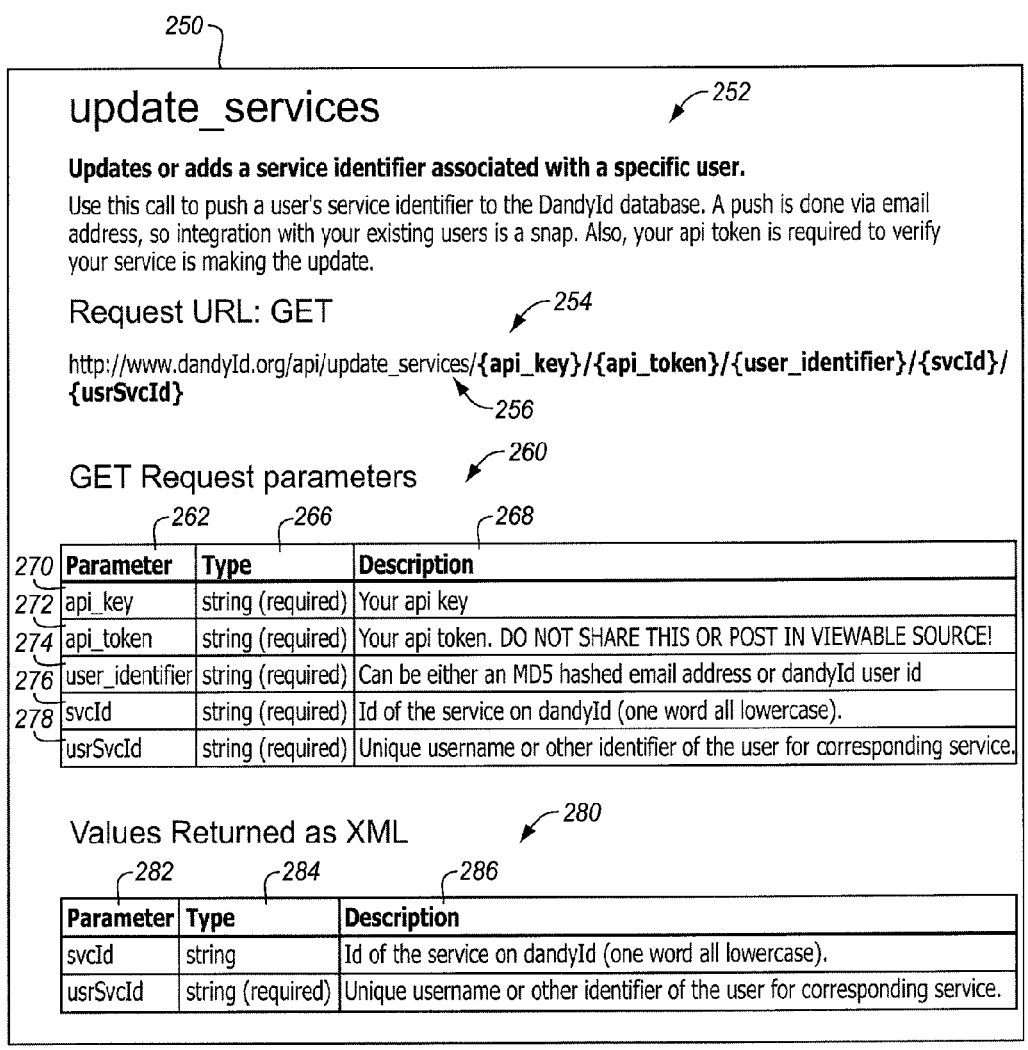
FIG. 7 illustrates a preferred embodiment according to the invention of call to push a web site or application's user's identifier to the IG and SG repository.

FIG. 7 illustrates a preferred embodiment according to the invention of documentation 250 for a call to push a web site or application's user's identifier to the IG and SG repository 50. Again, this documentation starts with a description 252 of the call and its usefulness. The GET is described at 254. As can be seen from the structure of the GET at 256, the GET goes to the services page of the repository 50. The parameters of the GET are described at documentation portion 260, which includes a parameter column 262, a type column 266, and a description column 268. As indicated in the type column 266, all the parameter types are preferably strings. The first parameter 270 is the pusher site's API key. The second parameter 272 is the pusher site's API token, which is a security code, which preferably, along with other sensitive information, may be pushed in by more secure means in future iterations. The third parameter 274 is the user identifier for repository 50, which is preferably an MD5 hashed email address, but may be any other identifier. The fourth parameter 276 is the ID of the pusher web service or application in the repository 50. The fifth parameter of the GET 254 is the unique username or other identifier of the user on the pusher web site or application. To confirm that the information sent has been received, the repository 50 returns the values shown in documentation 280. The documentation 280 includes a parameter column 282, a type column 284 and a description column 286. The first value returned is, svcid, the ID of the pusher web service or application on the repository system 50, and the second value returned is the unique username or other identifier of the user in the pusher web service or application. The return is preferably made in conventional XML code as before, which should be understandable from the foregoing description. While the information may be pushed to the repository whenever the web site or application desires to activate the push process, it is preferably subject to the permissions page. In one embodiment, it is not made available to others by repository management system 50 until the individual user gives an appropriate permission. See the permissions discussion below.

FIG. 21 illustrates a preferred embodiment according to the invention of documentation 900 of an API call to obtain a social graph of an Internet user. The documentation 900 first describes the usefulness of the call, i.e., to link to other DandyID users that were specified by a DandyID user as their contacts. The GET is shown at 906. The get directs the call to the system web site services engine and indicates at 907 that the request must include an API key and at 908 that it must include a user identifier. The GET request parameters are described at 910 and include a parameter column 912, a type column 914, and a description column 916. As indicated, both the API key and the user identifier are preferably strings. We shall discuss below how the caller gets an API key and user identifier and the preferred form of the API key and the user identifier. The documentation 900 describes the values returned by the GET 906 at 920, which description includes a parameter column 922, type columns 923 and 924 and a description column 926. The collection of parameters that describes the contact is an XML node, and, in this case, the parameters themselves are preferably strings. The first parameter returned is the ID of the user in the repository 50. The second parameter is the email of the contact which is enciphered in an md5 hash. This parameter can be used with the call "return_profile" to get more information about the contact. The third parameter returned is the URL to the contact's public DandyID profile. The preferred embodiment of the response is shown at 930. The response shown is in conventional XML notation but could be returned in any other data format as well. The first line 934 indicates that the user contacts are to be listed. The return for each contact begins with the contact return start indication at 936 and ends with the contact return end indication at 947. The first listing 938 on this particular response is for a fictitious user with the user ID "1". The email of the user is returned at 939, and the user profile is returned at 940 with the URL address 941 of the user profile web page. After the contact return end indication at 947, a new contact return start is indicated at 948. The next return 950 is for a fictitious user with the ID "3". Based on the above, the rest of the return should be understandable. This return ends with the end indication at 956, and then the completion of the return is indicated by the "userContacts" closing at 958.

A feature of the data returns is that the data is extensible. Attributes of an internet user's identity can be easily added or removed without affecting the overall integrity or usability of the data structure. One web service or user can request a first set of attributes, and another web service or user can request another set of attributes. If a set of attributes is available, but not requested, it can easily be skipped by the return. Preferably, all data stored in the repository 50 is similarly extensible.

FIG. 8 is an exemplary embodiment of a signup page 300 for an internet user, a web site or an application to register to utilize the system 10 according to the invention. The signup page includes places 304 and 306 for the internet user, web site or application name, a password 308 created by the signupee, a confirmation 310 for the password, and email address 312, a confirmation 314 for the email address, and a space 316 to report on how the signupee heard about the repository 50. If the signupee is only an internet user, the submit button 318 would be activated at this point. However, if the signupee is a developer, web service, website or application, that has user's itself, and thus would have information on other internet users to supply to the repository 50, have a need for the services provided by the repository, 50 or other reason to obtain and API key, the signupee can continue and provide a product name at 332, at URL at 334, a telephone number at 336, and a description of the web service, web site, or application at 340. The number at 342 indicates that the number of characters remaining that the signupee has to provide the description in box 340. After filling in boxes 332, 334, 336, 338 and 340 the signupee would activate the submit button 344. The function of the buttons 350 are conventional or have been or will be explained elsewhere herein.

Figure 9:
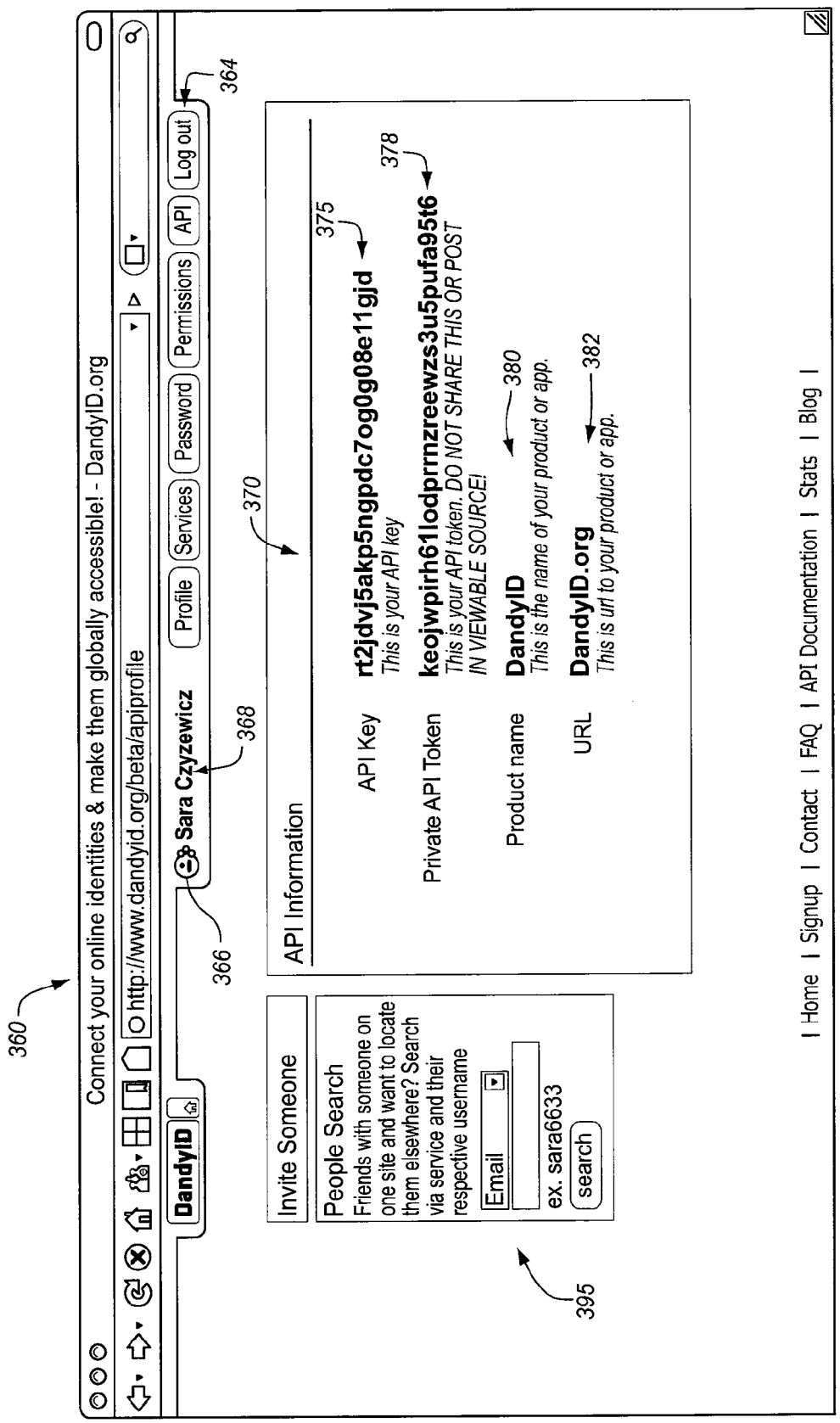
FIG. 9 illustrates a preferred embodiment of a result when the "Request API Key" box is checked on the signup page of FIG. 8.

FIG. 9 illustrates a preferred embodiment of the API page 360 of a user of repository 50, and at the same time indicates a preferred return when the "Request API Key" box is checked on the signup page of FIG. 8. This the API page as it is preferably displayed on the browser of a Macintosh computer, and some of the icons and features that are conventional will not be discussed herein. The name of the user is displayed at 368 and an icon 366 can be used to designate the user. Except for the "logout" button, which has a conventional function, the buttons 364 take the user to various user pages of the repository management system 50. The "password" button takes the user to a page that allows the user to change their password, and is conventional so will not be described herein. The API button is the button for the page 360 displayed in FIG. 9. The pages that appear when the Profile, Services, and Permissions buttons are clicked on will be described below. The Invite Someone feature 390 allows a user to send a message to a friend to invite them to use the repository management system 50. The People Search feature 390 will be discussed below. The information returned when the "Request API Key" box is checked on the login page 300 is shown on the API page 360 at 375, 378, 380, and 382. The API key is a unique string which allows the user to push information to repository 50 and otherwise interact with the repository. The private API token 378 is a security code for the services of the repository 50. The Product Name 380 and URL are the product name and URL, respectively, entered on the login page 300.

Figure 10:
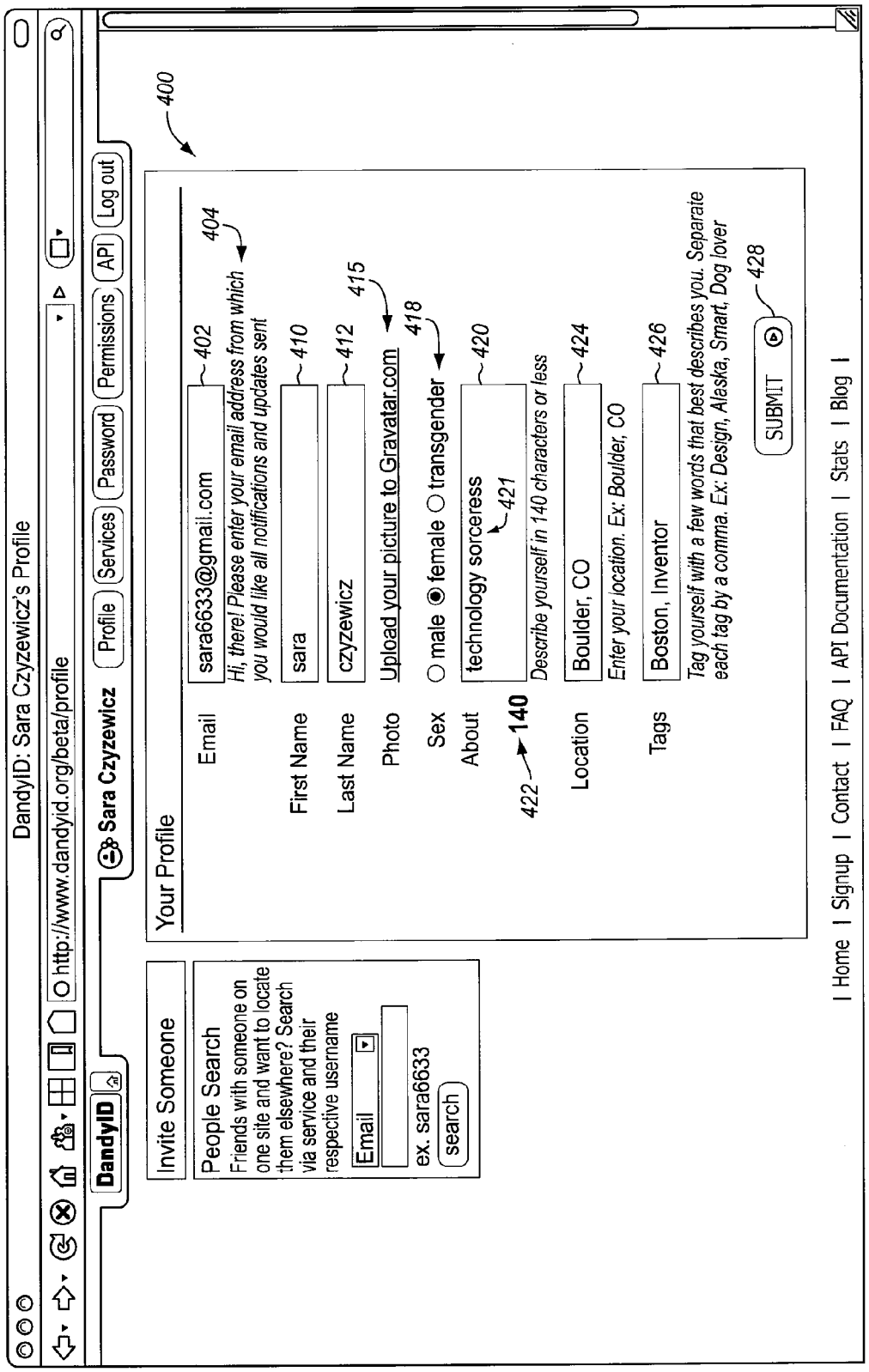
FIG. 10 illustrates an exemplary embodiment of profile creation page on the system according to the invention.

FIG. 10 illustrates an exemplary embodiment of profile page 400 on the system 10 according to the invention. When a user joins the web site according to the invention, or otherwise logs in, the user can use this page to add additional information to their public identities. The information on the page includes email address 402, first name 410, last name 412, a photo upload button 415, a gender check off 418, an About information entry box 420, a location box 424, and a Tags box 426. The photo button 415 permits the user to upload the photo to a photo web site from which the photo can be imported and exported throughout the system 10. The About box 420 allows the user to describe themselves, such as at 421. In other words, this is a biographical function. In one embodiment, the number 422 tells the user how many more characters are available in the bio in the About box. However, it will be understood by one skilled in the art that the amount of space for bio information can be easily changed. In one embodiment, it is unlimited. The location box is used to state where the user lives or other location, and the Tags box 426 permits short descriptors in a form that can be easily searched. Boxes that are not self-explanatory have a short descriptor, such as 404, below them to assist the user in entering information. Page 400 shorter version of the current profile page, to fit the United States Patent Office drawing requirements;

the current profile page of the system contains additional information such as colleges, phone numbers, organizations and employment information. The profile page can be changed at any time by revising it and activating the submit button 428, and in some cases may be changed in real time without such activation.

Figure 11A:
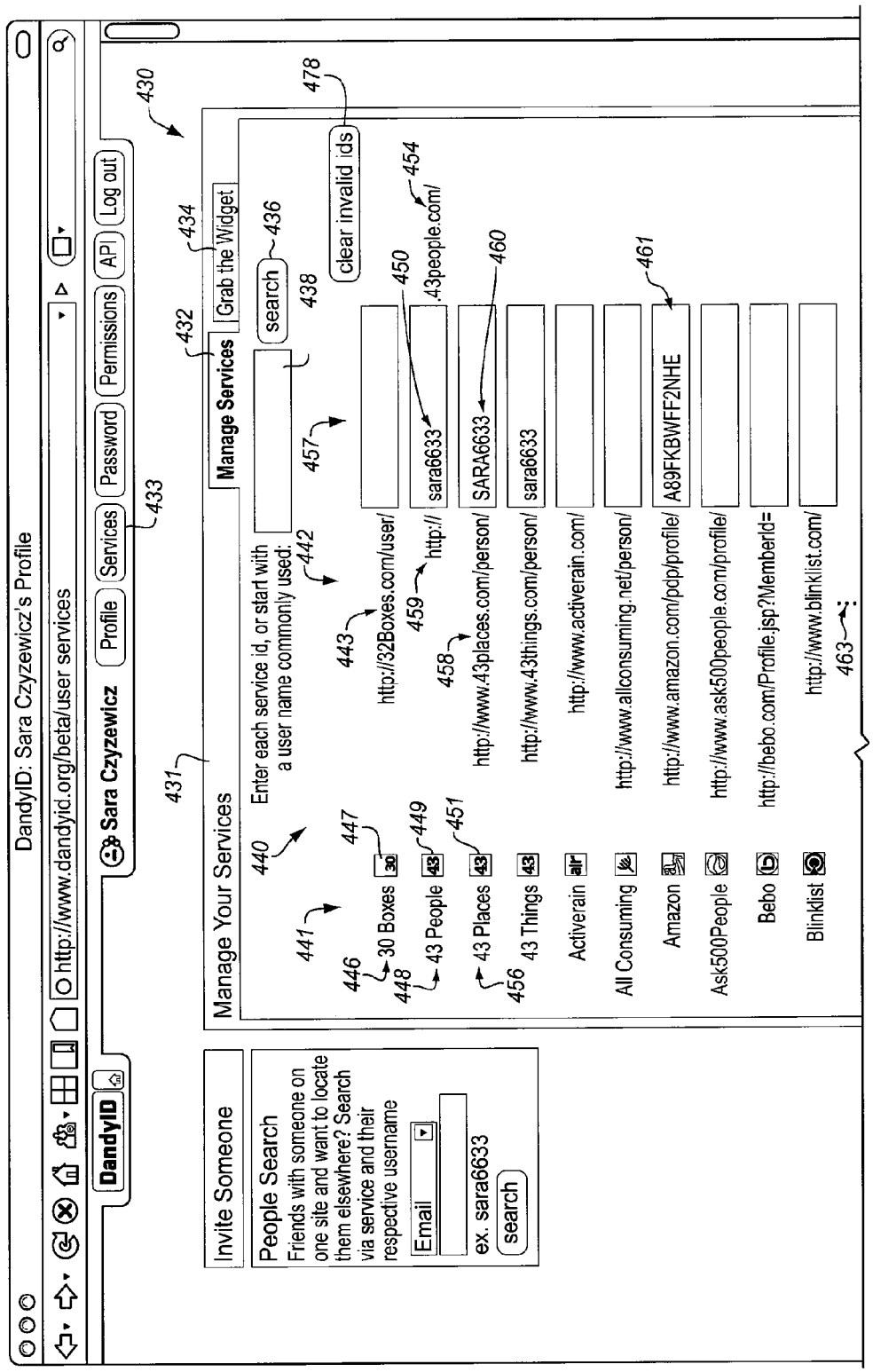
FIGS. 11A and 11B show a preferred embodiment of a services management web page according to the invention illustrating a user's identity graph including the user's identity on over a hundred different web sites.
Figure 11B:
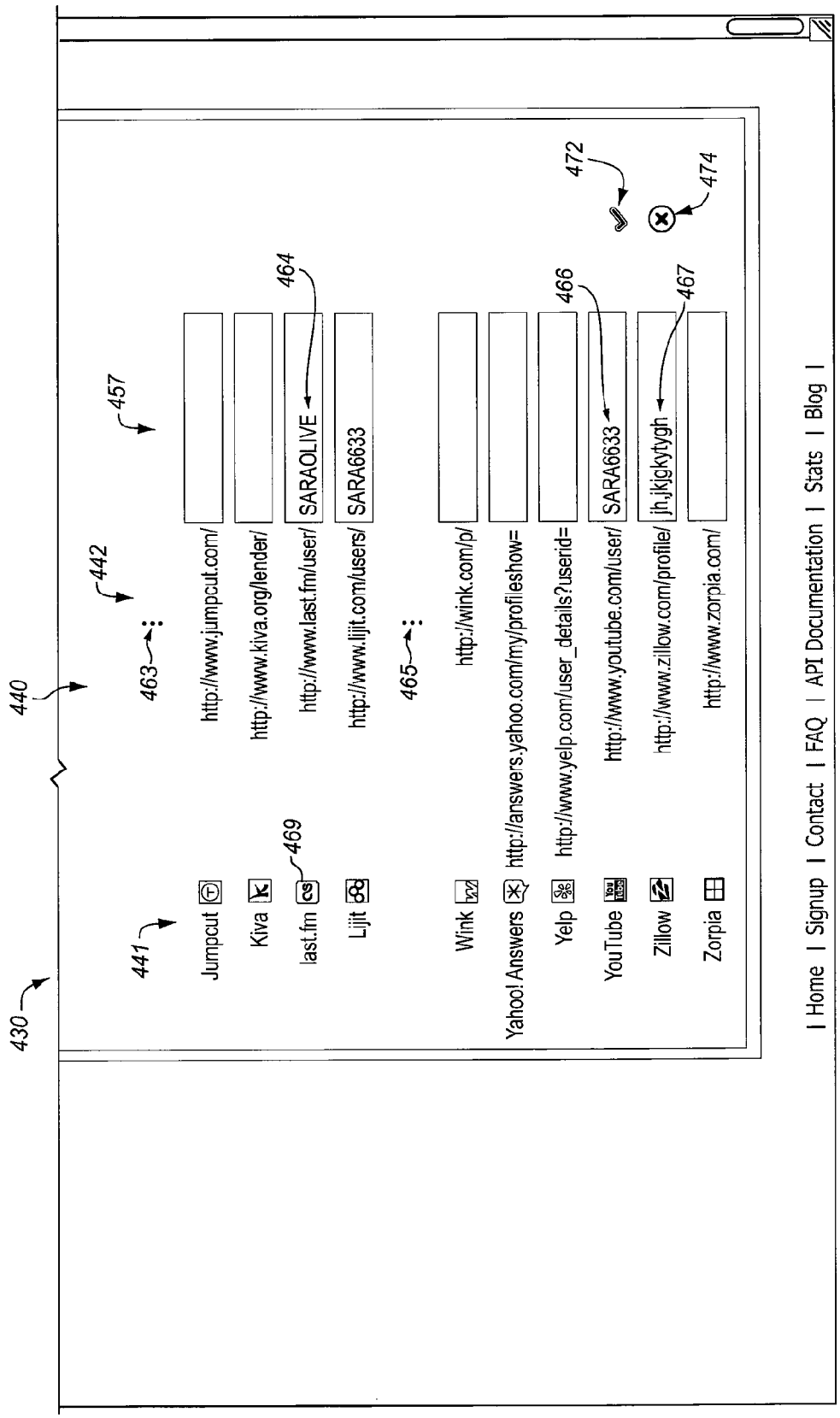
Figure 12:
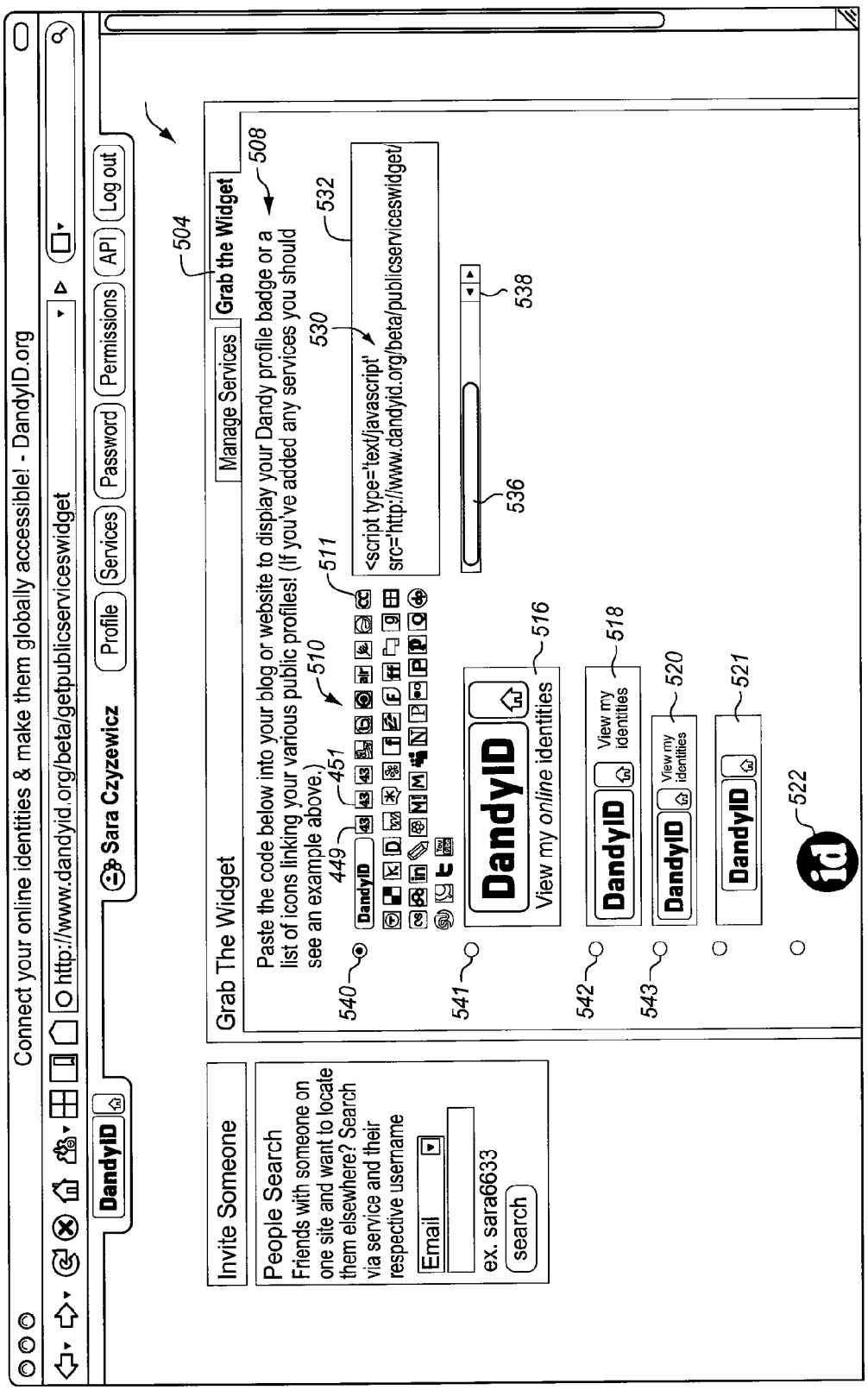
FIG. 12 illustrates an exemplary embodiment of a page that makes available to a user various widgets, including the widget of FIG. 4.

FIGS. 11A and 11B show a portion of a preferred embodiment of a services management web page 430 according to the invention illustrating a user's identity graph 440 showing the user's identity on the web sites 60, 62, 64, etc. that use the repository 50. At the time this web page was printed over a hundred different web sites were using the repository. FIG. 11A shows the top portion of the page 430, and FIG. 11B shows other portions of the page. While page 430 includes the approximately 100 web sites and applications which were associated with the repository 50 at an early stage in the development of the site according to the invention, not all are shown to save space. The dots 463 and 465 on FIG. 11B indicate portions of the page that are missing. Clicking on button 433 makes two page buttons available: a manage services button 432 and a Grab The Widget button 434. FIGS. 11A and 11B show the page 430 displayed upon clicking on the Services button 433, and FIG. 12 shows the page 500 displayed upon clicking the Grab The Widget button 434. The term "Services" in the title 431 of the page 430 designates the web services, web sites or applications on which the user is registered. The web services, web sites or applications that are included in the repository management system 50 are listed in column 441. The URL at which the personal page of the user may be accessed is listed in column 442. Preferably, column 441 has two parts, a web site or application name, such as 446, and an icon 447, which is a short-cut to the particular web site or application. It should be recognized that the URL 442 has one, two, or three parts. The first part and the third part, if it exists, are the parts of the URL that are the same for each user of the site or application. The second part is the variable part of the URL which preferably indicates the user's identity on the site or application. For example, for the web site 30 Boxes, shown at 446, there is only the first part 443 of the URL. The box 444 for the second part is empty because this user is not registered at the 30 Boxes web site. For the entry 448 for the site 43 People, there are three parts, 459, 450 and 454. The part 459 is the first part of the standard URL and the part 454 is the last part of the standard URL. For this site, it is the middle part 450 of the URL that varies. In this case, there is a second part 450 because this user is registered on that site with the identity sara6633. For the web site 43 Places, there is a first part 458 but no third part because the URL has only one standard portion. There is also the second part 460, because the user is registered for this site also. Column 442 also shows that this user is registered on Amazon with the identity A89FKBWFF2NHE. The Manage Services page provides a useful way to discover the web sites on which a particular user has an identity. Referring to FIG. 11B, if one types a user identifier in the identity box, such as 466, associated with a particular web site or application, in this case YouTube, and clicks on the icon, the system according to the invention goes out and checks if that identifier is in use on the site. In this case it is, and the system indicates this by showing a check mark 472. However, if the user identifier typed in the box is not in use on the site, such as the identifier jhjkjgkytygh 467 for the web site Zillow, the system according to the invention indicates that this identifier is invalid by placing a red "X" next to the entry. Returning to FIG. 11A, an even easier way to determine which web sites or application a particular user is registered on, is to enter the user identifier in box 438 and clicking on "Search" at button 436. The system then prepopulates the boxes in column 457, that is, automatically enters this identifier in all empty boxes in column 457, then goes out and checks to see if the identifier is valid on the corresponding web site. After this is done, the invalid identifiers can be cleared by clicking on button 478. This quickly finds and records all the web sites and applications on which a particular identifier is registered. In this way, one can quickly find all the web sites on which he or she is registered or on which a friend whose identifier is known is registered. In this particular example, icons for all the web sites that the particular user, Sara Czyzewicz, is registered are displayed on her repository profile page, at 570 (FIG. 13) or at 610 (FIG. 14).

FIG. 12 illustrates an exemplary embodiment of a page 500 that makes available to a user various widgets, including the widget 114 of FIG. 4. This page 500 is displayed when the grab the widget button 504 is activated. The code 530 for the widget is displayed in the window 532. The code associated with the widget is generally longer than can generally fit in window 532, thus a scroll bar 536 is provided. The arrow buttons 538 on the scroll bar enable the user to scroll through the entire code 532. On the current version of this page, one can dynamically select the widget code 530 of interest by clicking on one of buttons 540, 541, 542, 543, etc. In the example shown, the button 540 has been selected. Clicking on button 540 makes available the widget corresponding to the set 510 of icons, such as 511. These icons, such as 511, are the icons associated with each of the web sites or applications on which this particular user, Sara Czyzewicz, is registered. These are the same icons, such as 449 and 451, with which an identity, such as 450 and 460, is associated in the list 440 of FIGS. 11A and 11B. This set of icons 510 can be thought of as a succinct summary 510 of the internet user's identity graph, in this instance the identity graph of Sara Czyzewicz. This summary 510 may be transferred to the user's blog, the user's page on some other web site, to a third party web site or application, or any other web site or application that a person that has access to page 500 desires. The code 530 generates the corresponding list 510 of icons and their function on the outside web site or application. The system 10 permits this code 530 to be copied to the outside web site or application. After the code is copied to the desired web site or application, it will generate the corresponding icons, collectively referred to as the service widget, and when any of the icons is activated, for example by clicking on it, it will link the user to the user's public profile page on the corresponding web site or application. The code 530 may be copied by retyping, dragging it to the desired web site or application, or in any other manner known in the art. In this manner the user's identity graph 510 becomes easily portable.

Page 500 also provides a variety of badges 516, 518, 520, 521, and 522 that also can be generated on any web site or application by copying the code or widget corresponding to that badge to the desired web site or application. The appropriate widget is dynamically presented in the window 532 by clicking on the corresponding button 541, 542, 543, etc. A variety of different badges of a variety of sizes and shapes are provided so that a user or a web service or application can find one that integrates easily into the desired web page or application. Any of the badges, such as 516, is a link to a page that is shown in FIG. 13 or FIG. 14, which will be discussed below.

It should be understood that a widget function such as just described can be created for each of the relationships of a particular user. FIG. 21 below illustrates a call used for transporting the user's social graph (See FIG. 13). That is, the user's social graph can be transported to any web site or function in the same manner as just described for the user's identity graph. In summary, the widget function shown in FIG. 12 permits any user, or a web service or application, preferably with permission from the user, to retrieve and display the user's identities off the repository site 50 and the widget function of FIG. 21 permits any user, web, service or application, with permission of the user, to retrieve and display the user's contacts off the repository site 50. It allows anyone to create an identity graph, such as FIGS. 11A and 11B or a social graph, such as 560 in FIG. 13, on any web site. For example, an individual user can build an identity graph of herself or himself, an identity graph of each of their friends, and a social graph of themselves and their friends on their own blog, or any other site. The social graph function discussed below displays to a user all their friends on particular web sites and allows the user to designate whether each individual friend should also be a friend on other web sites that on which the friend is registered. This can be done individually for each web site or application and each friend, or be done globally for all web sites or applications and/or for all friends. In addition, a web site or application, using the widget 900 of FIG. 21, can take a similar action via calls to the API, which allows the web site to retrieve and/or display social graph information of their users. In short, the invention makes identities, identity graphs, relationships and social graphs easily portable.

Figure 13:
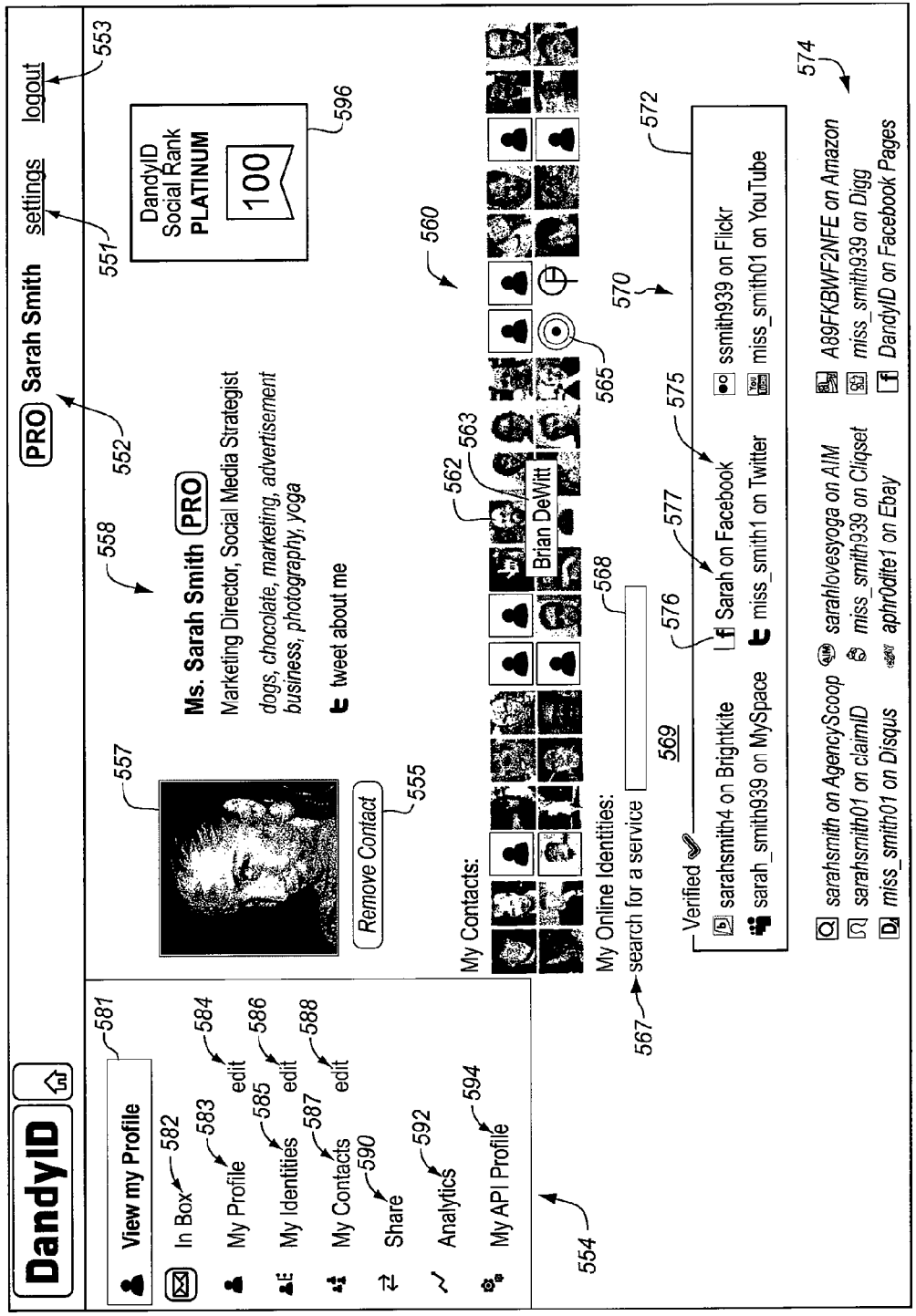
FIG. 13 illustrates an exemplary embodiment of a profile page according to the invention.
Figure 14:
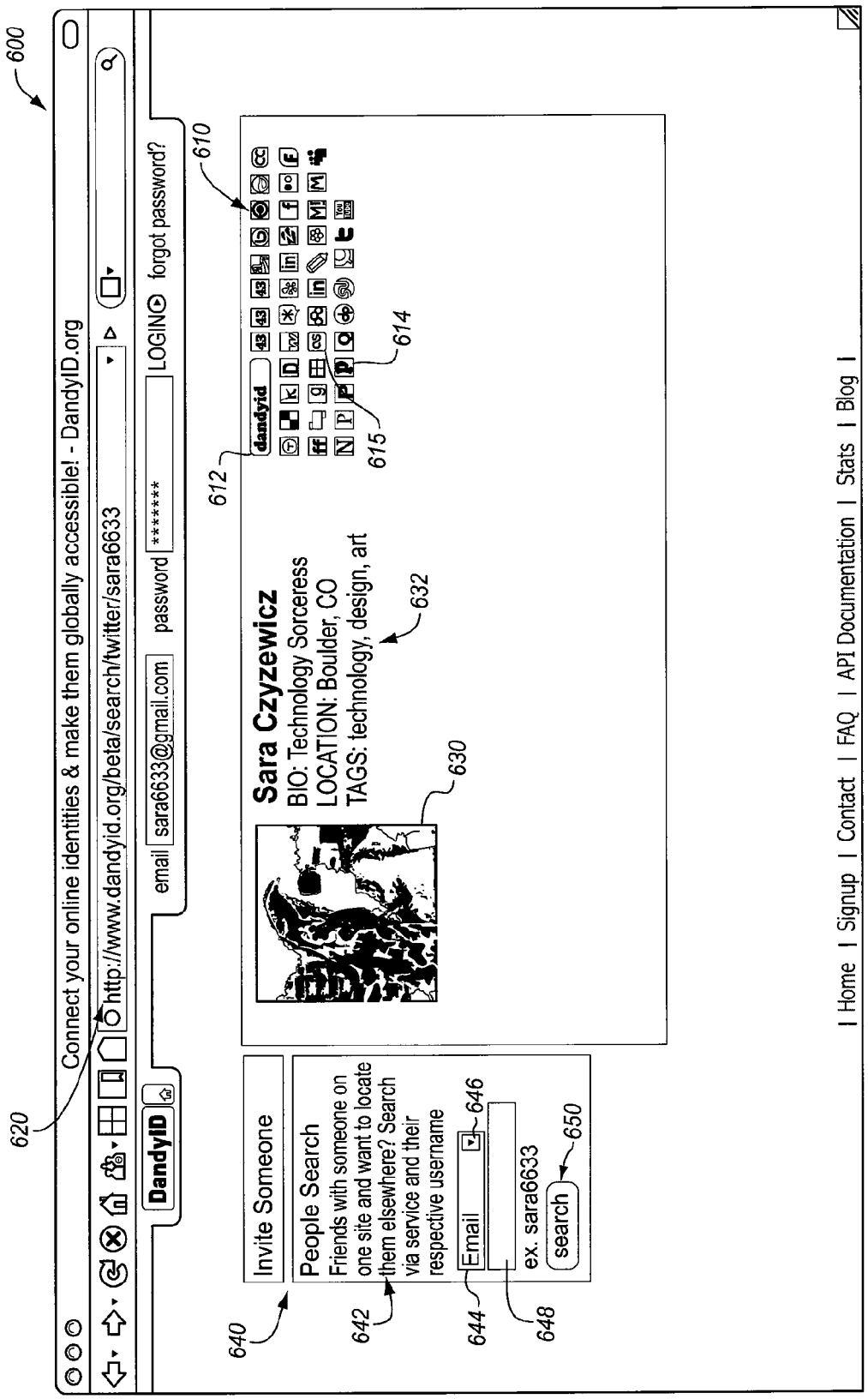
FIG. 14 illustrates another exemplary embodiment of a profile page of the system according to the invention.

FIG. 13 shows the current preferred embodiment of a profile page 550 when a user is logged in. Except for the editing and control functions 552, 554, and 555, page 550 is the same as the public profile page of the user. The settings function 551 allows the user to change their password, set prompts, such as for email notifications, and otherwise control their account. The log out function 553 logs the user out of the system. The profile page 550 includes a picture 557 and personal data 558 entered on page 400 of FIG. 10. Only a small portion of this personal data is shown in FIG. 13 for space reasons. The profile page 550 also includes a social graph 560 and an identity graph 570. Social graph 560 includes a picture, such as 562, or an icon, such as 565, for all the user's relationships. If the cursor lies on a picture, the system shows the name of the contact, such as 563. If the picture or icon is clicked on, it takes the user to the profile page of the contact in DandyID, or, if the social graph has been ported to another web site, to the corresponding profile page on that web site. The identity graph 574 is shown in two sections, a verified section 572 and a non-verified section 574. Each identity item, such as 575, includes an icon corresponding to a web site, web service or application, such as 576, and a designation 577 of the user's identity on that web site, web service, or application. Clicking on the icon, such as 576, links to the public profile page on the particular web site, web service or application. The verification function will be discussed in connection with FIG. 22. Since there are now so many web sites, services, and applications associated with the repository 50, the list 570 is getting lengthy. If the user prefers not to search for a particular service, the Search For A Service function 567 permits a service to be found quickly. By typing the service in box 568, the service is pulled into the area 569 below the box. If the user cannot remember the name of the service, but knows the first few letters of the name, a few letters can be typed in box 569 and all the services that include those letters will be pulled into area 569.

The "View My Profile button" 581 takes the user to this page 550, and is available on most pages of the system 50. The "In Box" button 582 takes the user to a page that permits the user to send and receive messages. The "My Profile" button 583 takes the user to a page such as 300 shown in FIG. 8 that permits the user to edit the user's profile. The "My Identities" button 586 takes the user to a page such as 430 (FIGS. 11A and 11B) which allows the user to edit and manage the user's identities on the user's services. The "My Contacts" button 587 takes the user to a page on which the user can edit his or her contacts. The Share function of button 592 will be explained in connection with FIG. 31 below. The analytics function 592 will be discussed in connection with FIGS. 22-26 below. The "My API" profile button 594 takes the user to a page such as 360 (FIG. 9) which permits a user to obtain and modify an API key. The Social Rank number at 596 shows the percentile rank of the user in relation to all users of the repository site in terms of numbers of different web services on which the user is registered. The process of determining this ranking will be discussed in connection with FIG. 27.

FIG. 14 illustrates another exemplary embodiment of a profile page 600 of the system according to the invention. This is an earlier version of the profile page prior to the completion of the contacts portability function but is useful in that it shows a different embodiment of a summary identity graph 610 of the repository management system website 50. The identity graph 610 or the entire page also could be placed on any other web site or application using the widget page of FIG. 12. This particular page was reached in this instance by using the People Search feature 640 if the invention, which will be explained below. The summary set of icons 610 is the same as summary set of icons 510 shown in FIG. 12, and was imported to this page using a function similar to how the service widget is generated. The DandyID badge 612 in this case just brings you back to this page, though if on other web sites or applications it would link to this page. Activating one of the icons, such as 614 links the user to the public profile page of the user on the web site or application corresponding to that icon. For example, clicking on icon 614 would take Sara Czyzewicz to her public profile on the Pownce web site. Thus, this feature normalizes entry to all the web sites and applications on which a user is registered. Page 600 also preferably includes a picture 630 and a profile block 632 which includes the public profile information entered on the profile page 400 of FIG. 10.

Figure 15:
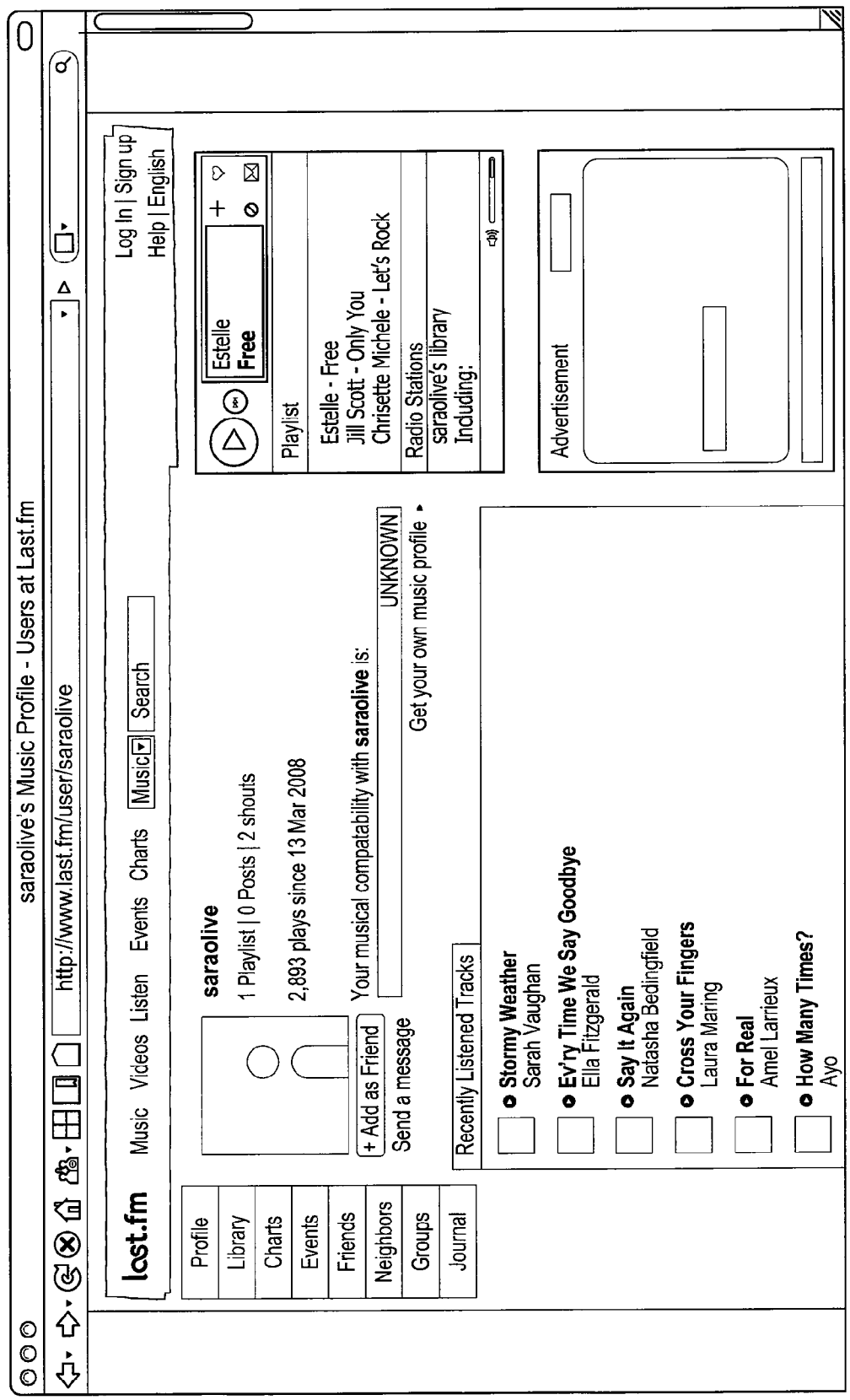
FIG. 15 shows a preferred embodiment of a LAST.FM web page screen reached by clicking on the LAST.FM icon of FIG. 14 or FIG. 11B.

The People Search feature 640 shown in FIG. 14 is on many pages of the web site generated by repository management system 50 and is a very useful feature of the invention. Clicking on the arrow 646 opens a drop down menu listing the service IDs of all the web sites and applications in the list 470 of FIGS. 11A and 11B. Clicking on one of the service IDs in the drop down menu, enters it in box 644. Entering an identifier in box 648 and activating the search button 650 will take you to the public profile in the repository management system 50 of the user associated with that particular identifier on the web service or application entered in box 644. Thus, if you know the identifier that a friend uses on a particular web site or application, you can find their public profile on the web service of the repository management system 50. As can be seen from the URL 620, this particular example of a page 600 was brought up by entering the Twitter service ID in box 644 and Sara Czyzewicz's identifier, sara6633, in box 648 and clicking on the search button 650. Then, by using any of the icons 610 the user that found Sara on the web site according to the invention, can then easily go to the public profile page of Sara on any of the web sites on which she is registered. Thus, it is evident that the combination of the People Search feature 640 and the icon summary 610 allows a user to discover the entire web identity of any friend who has entered the appropriate permissions. As an example, FIG. 15 shows the public profile page of Sara Czyzewicz on the LAST.FM web site. This public profile page was reached by clicking on the LAST.FM icon 615 on Sara's public page of the repository management system 50 of the invention FIG. 14. Note that Sara's identifier for this web site is "saraolive", which is different from her identifier on Twitter. In this way, one has obtained a new identifier of Sara, and can use it to find her on other web sites. An easy way of doing this, is to enter "saraolive" in the search box 438 of the Manage Services page 430 (FIG. 11) which will automatically show each of the web sites and applications on which this identifier is used. A feature of the invention that is being implemented is to automatically perform the entire search and discovery function given just one identifier of a friend.

While the People Search feature has been described in terms of a window and drop down menu, it should be understood the same function can be accessed in other ways. For example, in a current embodiment, it is available via an API. That is, third parties can request the same information from the repository via an API extension to that described above. Those skilled in the art will understand how this is implemented from the above discussions.

Figure 16:
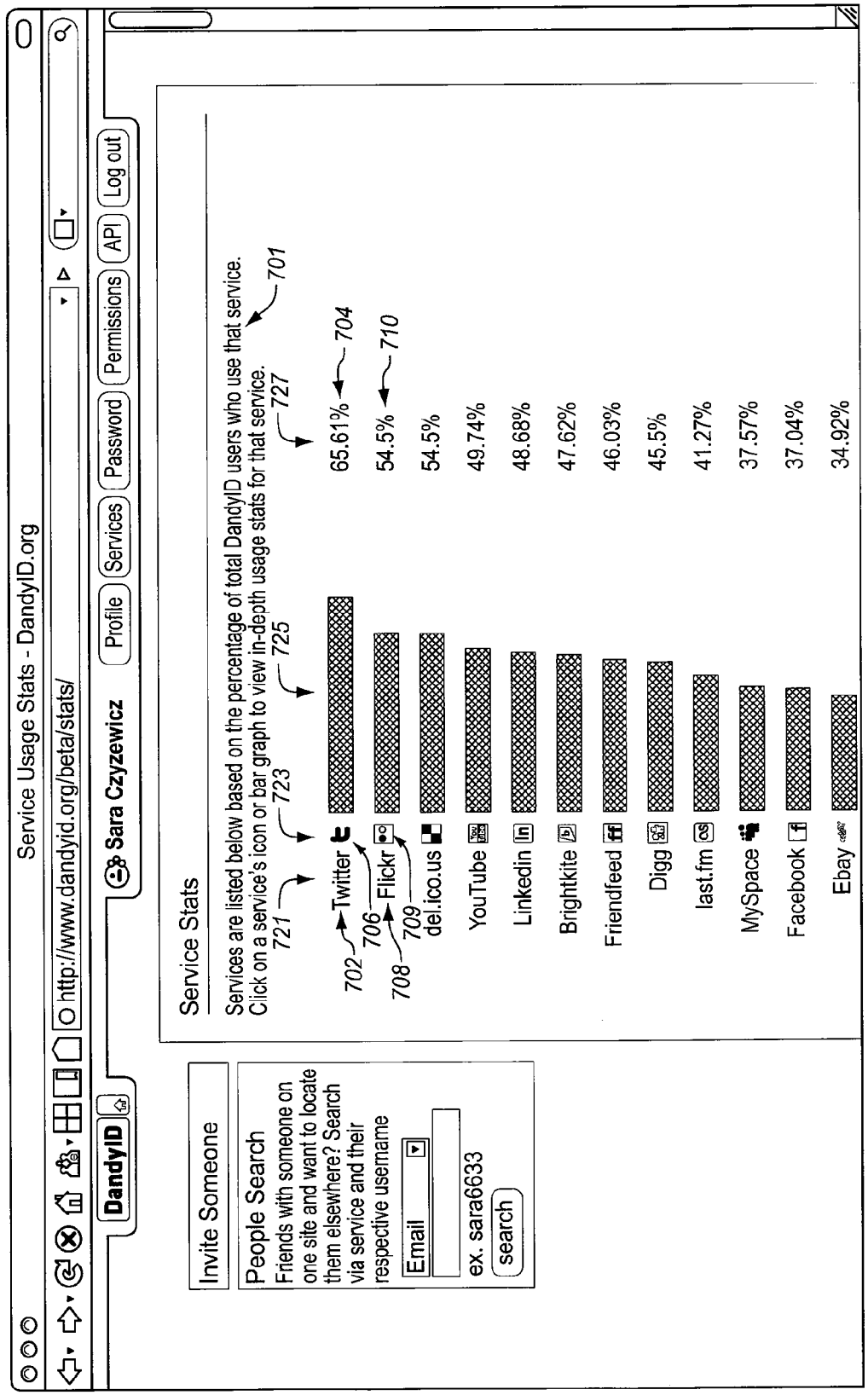
FIG. 16 shows a preferred embodiment of a portion of a web page screen according to the invention showing the statistical correlation between users of a web site according to the invention (DANDYID) and other web sites or applications.

FIG. 16 shows a preferred embodiment of a web page screen 700 according to the invention showing the statistical correlation between users of a web site according to the invention (DANDYID) and other web sites or applications. Only a small portion of the page is shown to save space. If the entire web page had been shown, for all of the hundred or so of the web sites for which statistics were collected at an early stage of the development of the invention, it would have required six pages and the statistics would have decreased to about half a percent for the least correlated web site. The screen 700 includes a short description 701 of the functionality of the web page. This page 700 is generated by the analytics engine of 78 (FIG. 2) according to the invention. This analytics engine operates as follows. Since the identity graphs of the registered users of the system 50 according to the invention are known, the system uses the identity graphs to go out and find all the web sites and applications on which each user is registered, using the tools described above. These are all recorded in memory 56. The analytic tool then determines what percentage of the users of system 50 are registered on each web site in the system, and then generates screen 700. On screen 700 the web sites are preferably listed in the decreasing percentages. The name of each web site is given in a first column 721, the icon for that web site is given in a second column 723, a bar graph showing the percentage of users of the web site generated by the system 50 (DandyID) that are also users of the indicated web site in the same row. The numerical percentage is given in column 727. For example, the statistic for the web site Twitter is shown in row 702 and the statistic for the web site Flickr is shown in row 708. The icon 706 for Twitter is shown next to the name of the site. The bar graph provides a visual indication of the percentage of the DandyID users that also use Twitter. As indicated at 704, sixty-five and sixty-one one hundreds percent (65.61%) of the users of the DandyID web site also use Twitter. Similarly, fifty-four and five tenths percent (54.5%) of the users of DandyID also use Flickr, and so on for all the web sites and applications in repository management system 50.

Figure 17:
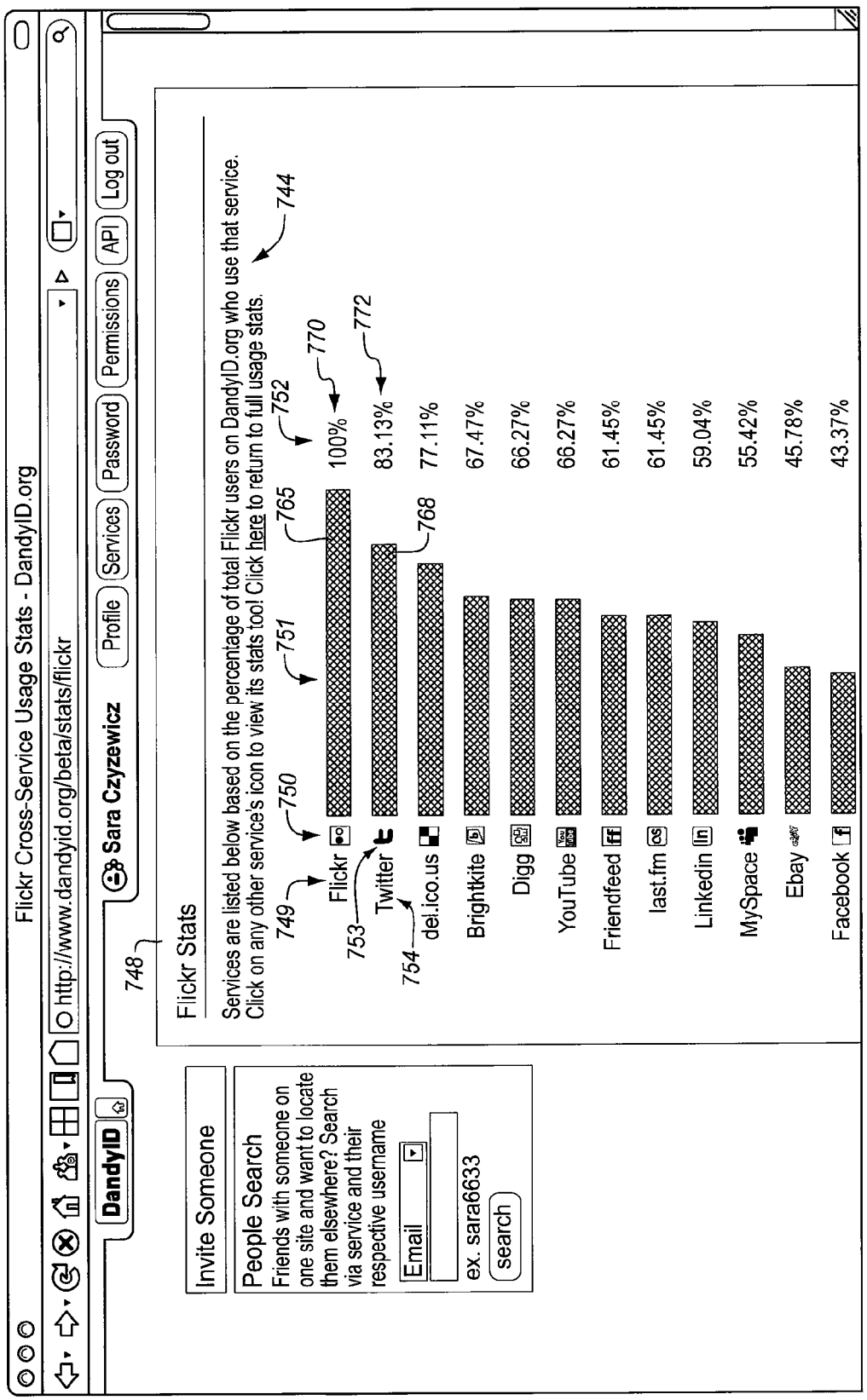
FIG. 17 is a preferred embodiment of a web page screen showing the statistical correlation between users of the Flickr web site and other web sites or applications.

FIG. 17 is a preferred embodiment of a portion of a web page screen showing the statistical correlation between users of the Flickr web site and other web sites or applications. If one activates the icon for a web site or application on the screen 700 or on the bar graph of FIG. 16, the analytics engine 78 according to the invention generates the statistics showing the percentage of DandyID users of that web site that use other web sites 17 from the same data that FIG. 16 was generated. For example, the screen 740 of FIG. 17 was generated by clicking on the icon 709 for Flickr. This screen 740 is similar to the screen of FIG. 16, except that the statistics show the percentage of total Flicker users registered on the DandyID web site that use the other web sites. Again, there is a column 749 for the names of the web sites or applications, such as 754, a column 750 for the corresponding icons, such as 753, a column 751 for the percentage bar graph, such as 768, and a column 752 for the numerical percentage, such as 772. The percentage for the first listed web site, such as 770, is always 100%, since that is the web site to which we are comparing the other web sites. That is, in the example shown in screen 740, 100% of the users of Flickr use Flickr. As shown in the example, eighty-three and thirteen 100ths percent (83.13%) of the users of DandyID that also use Flicker, also use Twitter. While it may at first be thought that because the statistics do not compare all web users, the statistics may not be accurate. However, those skilled in the art of statistics will recognize that once a significant number of users register at DandyID, say, ten thousand, then the statistics generated by the analytic engine 78 according to the invention will be very accurate, within a few percentage points of error, and the more users register at DandyID, the better will be the accuracy of the statistics generated.

Figure 18A:
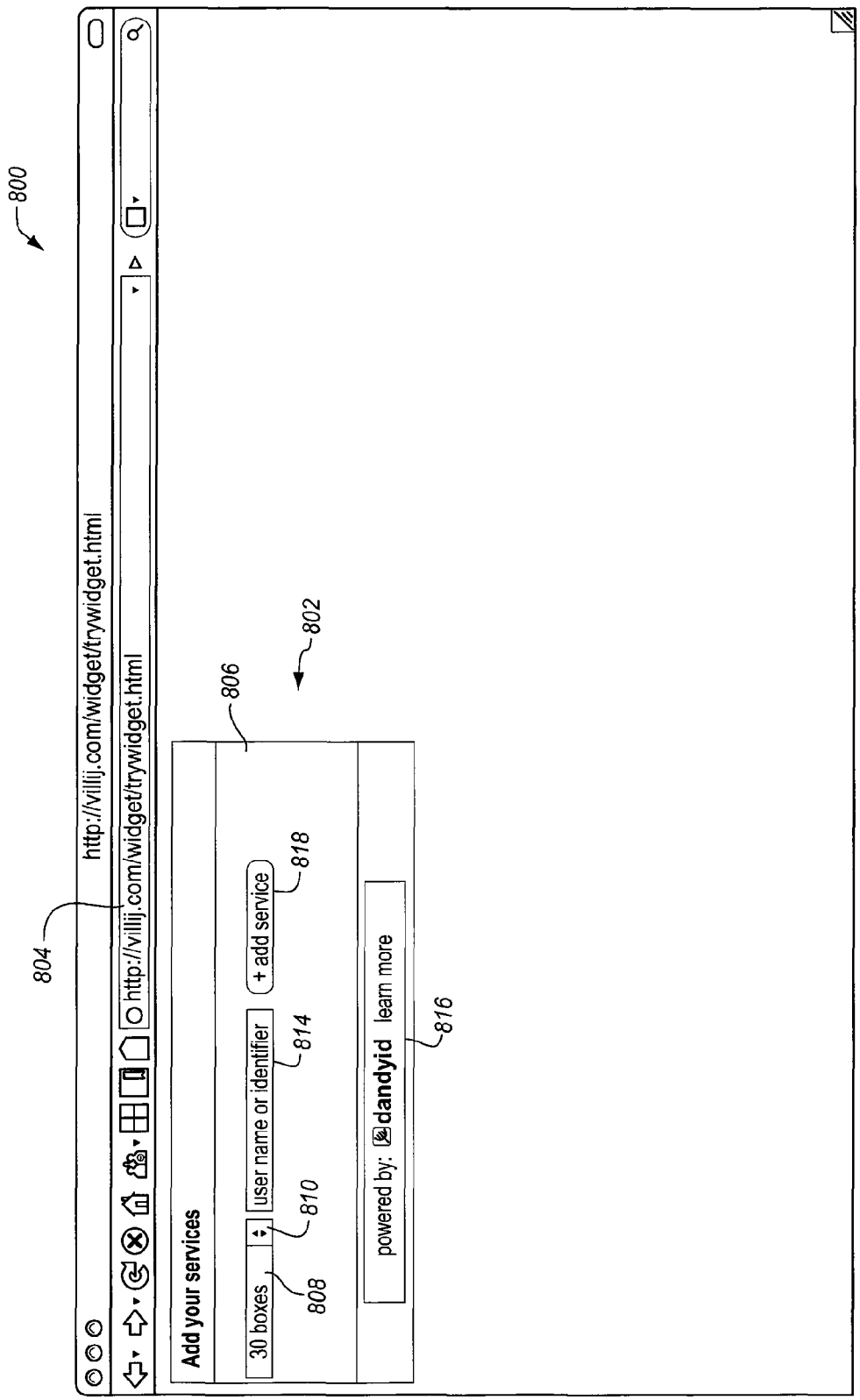
FIG. 18A is an exemplary example of a widget that permits a third party to transfer the functionality of the invention to their own web site.
Figure 18B:
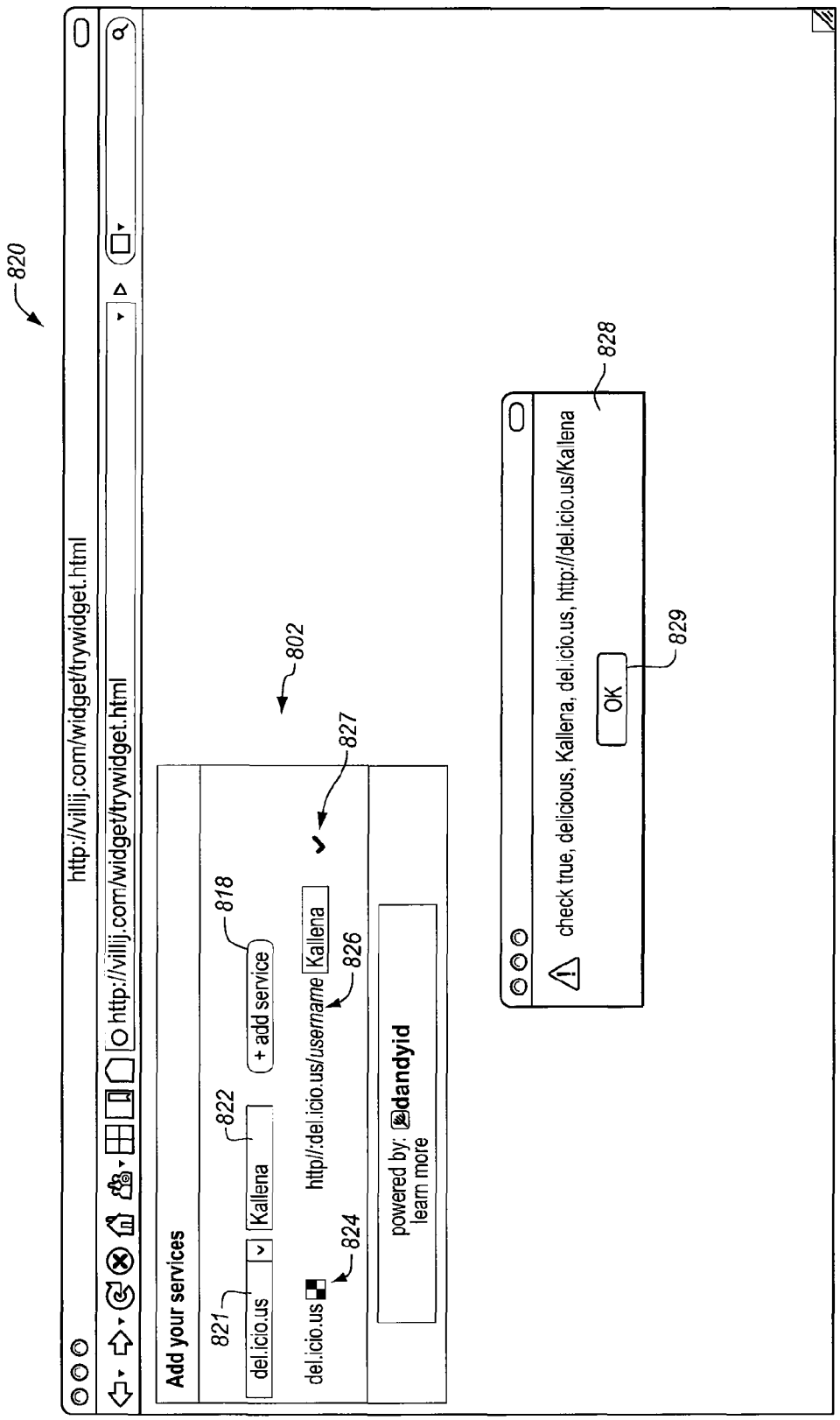
FIG. 18B shows the widget of FIG. 18A in the process of being used.

FIGS. 18A and 18B show a preferred embodiment of a web page 800, 820 of the system 10 showing an example of a call/push widget 802 that permits a third parties to transfer to their own web site or application the functionality of the invention described above. This call/push widget 802 can be considered to be an extension of the API 106. These screens 800 and 820 are normally integrated into the third party web site that is using the widget, which we will refer to as the calling/pushing web service. Widget 802 includes a menu window 808 having scroll arrows 810. Scroll arrows 810 pops a list of web sites or applications open and/or permit the user to scroll to a specific web site or application, which we will refer to as the external web service, shown in the select box 821 of FIG. 18B. The user name or identifier of the user associated with the selected external web service or application 821 is entered in box 814 as shown at 822 in FIG. 18B. Clicking on button 818 then submits a request to the system 50 to check if the identifier 822 is in fact valid on the external web service 821. If it is not valid, an X (not shown) will be displayed in the widget display area 802 at the same point as check mark 827. If it is valid the check mark 827 is displayed. The box 828 represents the information that is sent to the calling/pushing web service in the background, but is normally not displayed in a pop-up window as shown, as it disappears when the O.K. box 829 is clicked on. The calling/pushing web service can then do whatever it wants with the identity information, including pushing it back in to the repository 50. Normally, it is the user that is entering the data 821 and 822 into the widget 802 on the calling/pushing web site. If information associated with the user is already in the repository 50, this information will be auto populated into the widget 802 on the calling/pushing web site. The widget may also suggest to the user other identities of the user based on the information already in the repository. The widget provides the user the opportunity to confirm such additional identities. If the identities are confirmed, the additional identity information is provided to the calling/pushing web site. The user can also sync and manage the calling/pushing web services access to the repository 50 via this widget. The sync function compares the identities on the remote web site to the repository web site and edits any which are not the same so that they are the same. Button 818 allows the web site or application to learn more about the system of the invention.

Figure 19:
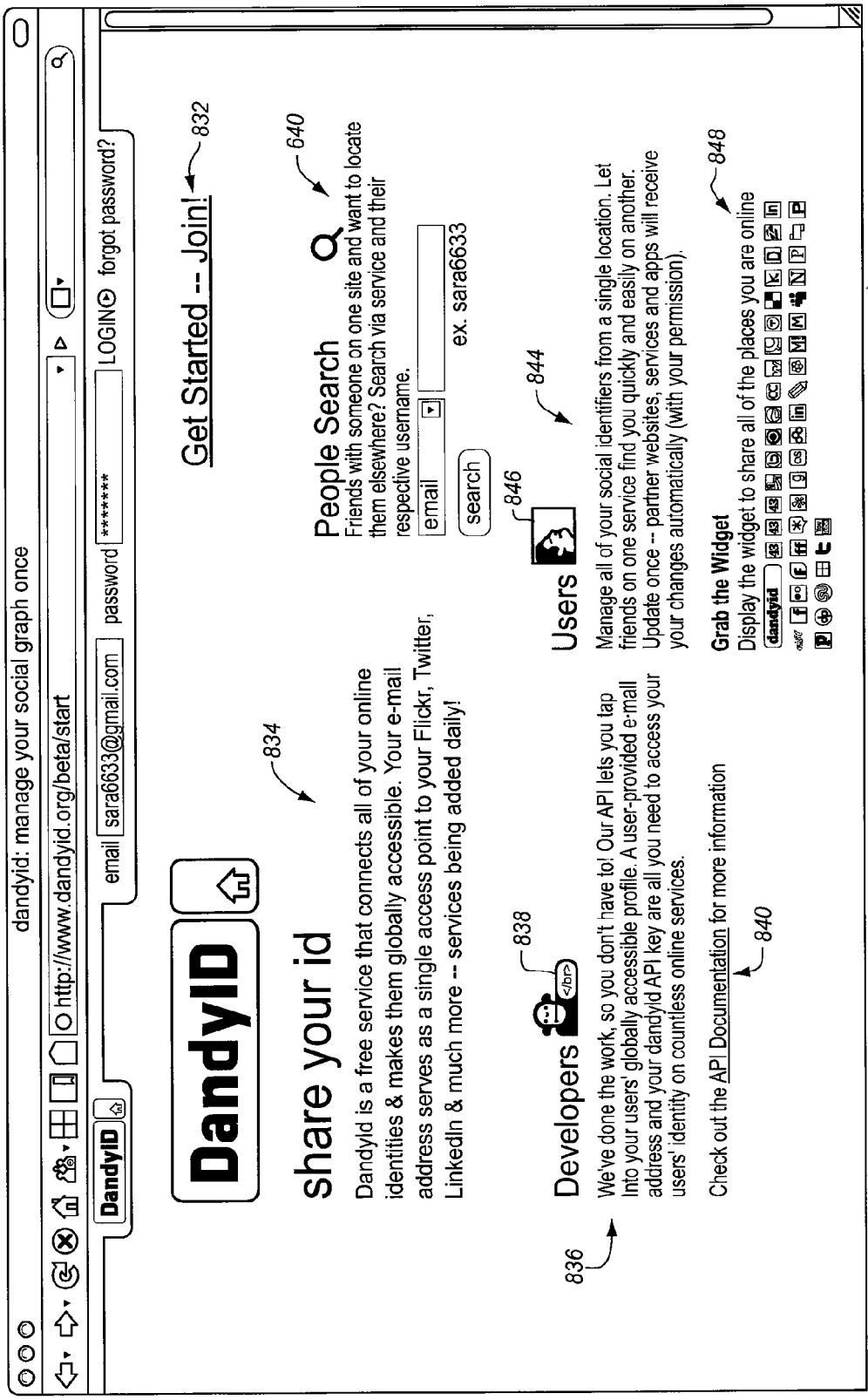
FIG. 19 illustrates an exemplary home page for a web site incorporating the invention.

FIG. 19 illustrates an exemplary home page for a web site incorporating the invention which summarizes the features of the invention described above. The join button 832 brings up the sign up page 300 (FIG. 8). As indicated at 834, the system 50 of the invention provides a free web service that collects a user's identities, such as by using the Manage Services function 830 (FIG. 11A) and the Grab The Widget function 500 (FIG. 12), and makes them accessible everywhere. Preferably, an email address serves as the user identifier, though it could be a cell phone number or other unique identifier. Preferably, the system 50 permits Individual users to create their own identifiers. Whatever the identifier, knowing just one identifier allows the user to access all of the user's web services from one point, such as the page 550 as shown in FIG. 13 or page 600 shown in FIG. 14. As described above, the user can obtain all of this simply by typing in one of the user's identifier once. The system 50 of the invention is accessible by any web site or application as described at 836. Icon 838 is not a button but is simply a symbol for a developer. The People Search function was described in connection with FIG. 14 and is available on the home page 830. Icon 846 is not a button but rather a symbol for users. As indicated at 844, the system 10 of the invention allows any user to manage all of the user's identifiers from a single location, lets a user's friends on one web site or application find the user on another web site or application. Similarly, a user can find a friend on almost any web site or application if the user knows just one of the identities of the friend. When a user wants to update the user's data, the user only needs to update it on the web site 830 generated by the invention 50, or via the widget 802 (FIGS. 18A and 18B), or via the API by some other method, such as one that is specific to a particular web site, and it is updated everywhere that the user has granted permission for the information to be updated. The Grab the Widget function as described in connection with FIG. 12 and is explained by clicking on 848.

Figure 20:
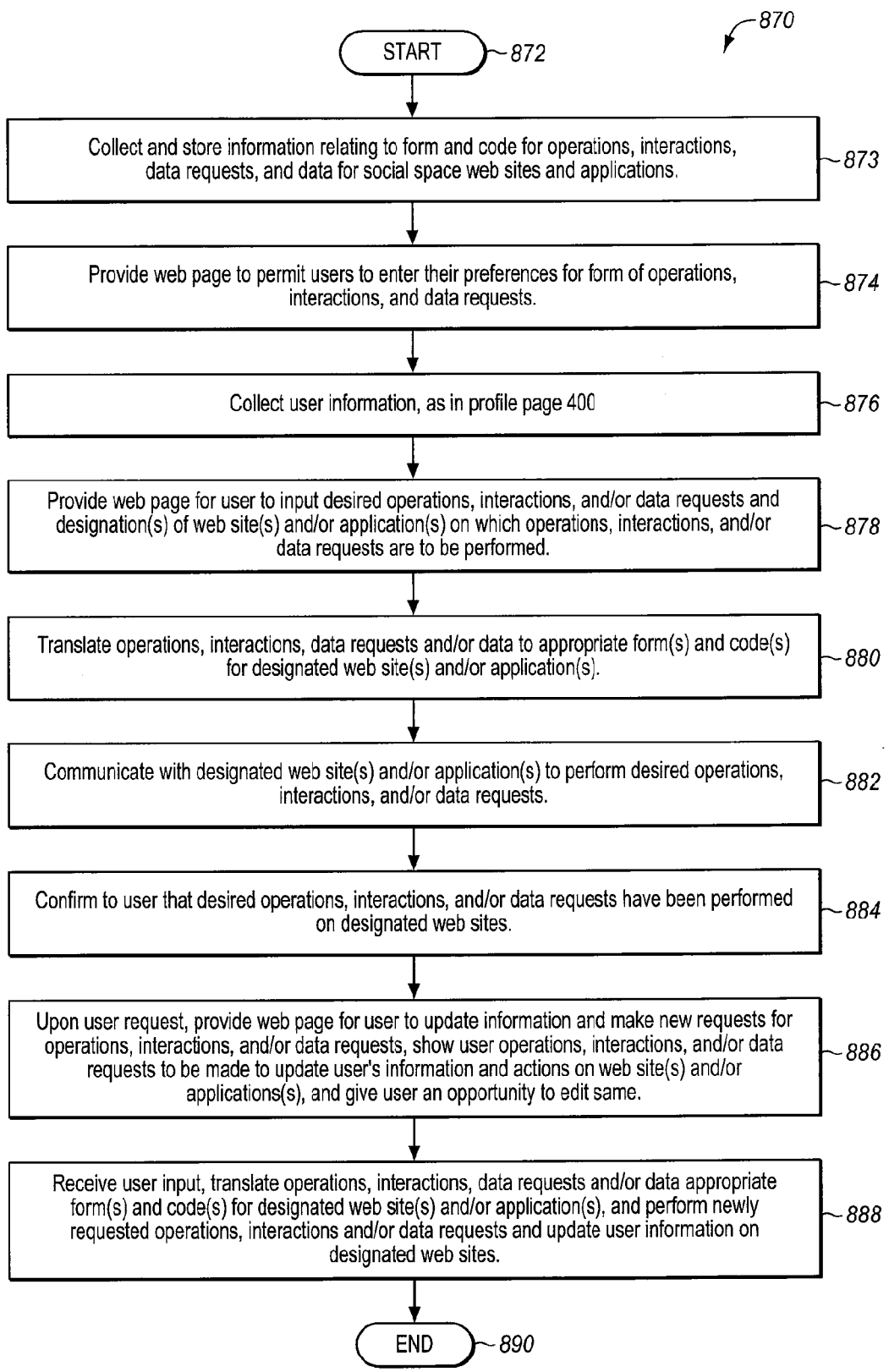
FIG. 20 is a flow chart illustrating an exemplary embodiment of a process for normalization of operations, interactions, data requests and data in the social web page space.

FIG. 20 is a flow chart 870 illustrating an exemplary embodiment of a process for normalization of operations, interactions, data requests and data in the social web page space. In this disclosure, "operations" are actions which create, add to, or otherwise change a web site or application, interactions are actions which result in or create exchange of information between web sites or applications or between a web node, such as a computer and a web site or application, data requests are actions that request data, and data has its conventional meanings. Normalization is useful because different web sites or applications have different ways of performing actions and different formats for data. For example, Flickr, a photosharing web site calls friends "contacts" and Twitter, a website on which friends up date each other on their experiences during a day, calls friends "followers. Forming a relationship is done on both web sites, but done differently. The sub actions that are involved, such as adding a contact, deleting a contact, or sending a message are different on both web sites. For someone who has many web sites on which they interact, it is difficult to remember which terminology and which update action goes with which web site. The system 10 of the invention allows the users of repository management system 50 to select the form of their actions and the format for data. Some types of actions that are different on different web sites and applications are: adding a contact, deleting a contact, sending a message, inviting, such as to a social event, blocking, staring, which also is called bookmarking or placemarking, depending on the web site, linking as in assigning an attribute or giving credit, set a trust level, and voting.

The normalization process 870 is started at 872. At 873, information relating to form and code for operations, interactions, data requests, and data for social space web sites and applications is collected and stored. At 874, the system 50 provides a web page to permit users to enter their preferences for form of operations, interactions, and data requests. User information is collected at, 876, preferably as in profile page 400 (FIG. 10). The system 50 provides, at 878, a web page or pages for a user to input desired operations, interactions, and/or data requests and designation(s) of web site(s) and/or application(s) on which operations, interactions, and/or data requests are to be performed. At 880, operations, interactions, data requests and/or data are translated to the appropriate form(s) and code(s) for the user designated web site(s) and/or application(s). At 882, the system 50 communicates with designated web site(s) and/or application(s) to perform the user-desired operations, interactions, and/or data requests. The system 50 then, at 884, confirms to the user that the desired operations, interactions, and/or data requests have been performed on designated web sites. At 886, upon receiving a user request, the system 850 provides a web page or pages for the user to update information and/or make new requests for operations, interactions, and/or data requests, then displays or otherwise communicates to the user, the user operations, interactions, and/or data requests to be made to update user's information and actions on web site(s) and/or applications(s), and gives the user an opportunity to edit the same. The system then, at 888, receives user input, translates the operations, interactions, data requests and/or data to the appropriate form(s) and code(s) for the designated web site(s) and/or application(s), and finally performs the newly requested operations, interactions and/or data requests and update user information on designated web sites. The process then ends at 890, though it may be re-entered at 886 at any time.

FIG. 21 has been discussed above between the discussions of FIG. 7 and FIG. 8. FIG. 22 shows an example of the service verification web page 1000 which is reached by clicking on the edit button 586 for the My Identities function 585 on the user profile page 550 (FIG. 13). Page 1000 shows all the icons, such as 1005, for the services of the particular user as well as a written name, such as 1006 of the web service. The user can click on an icon, such as 1006, and go to the public profile on that web service, and determine if the profile is his or her profile. If it is, the "verify" button 1008 next to the icon 1006 is clicked on, and a check mark, such as 1010 appears indicting that the user has verified that identity. As new verifiable web services are associated with DandyID, the icon for the service will show up on the Service Verification page 1000. Preferably, the check mark is variable to indicate various verification states. For example, the check mark may be one color, for example, green, if it has actually verified by the user, and is another color, such as a shade of gray, if it is verifiable but has not actually been verified.

Figure 23:
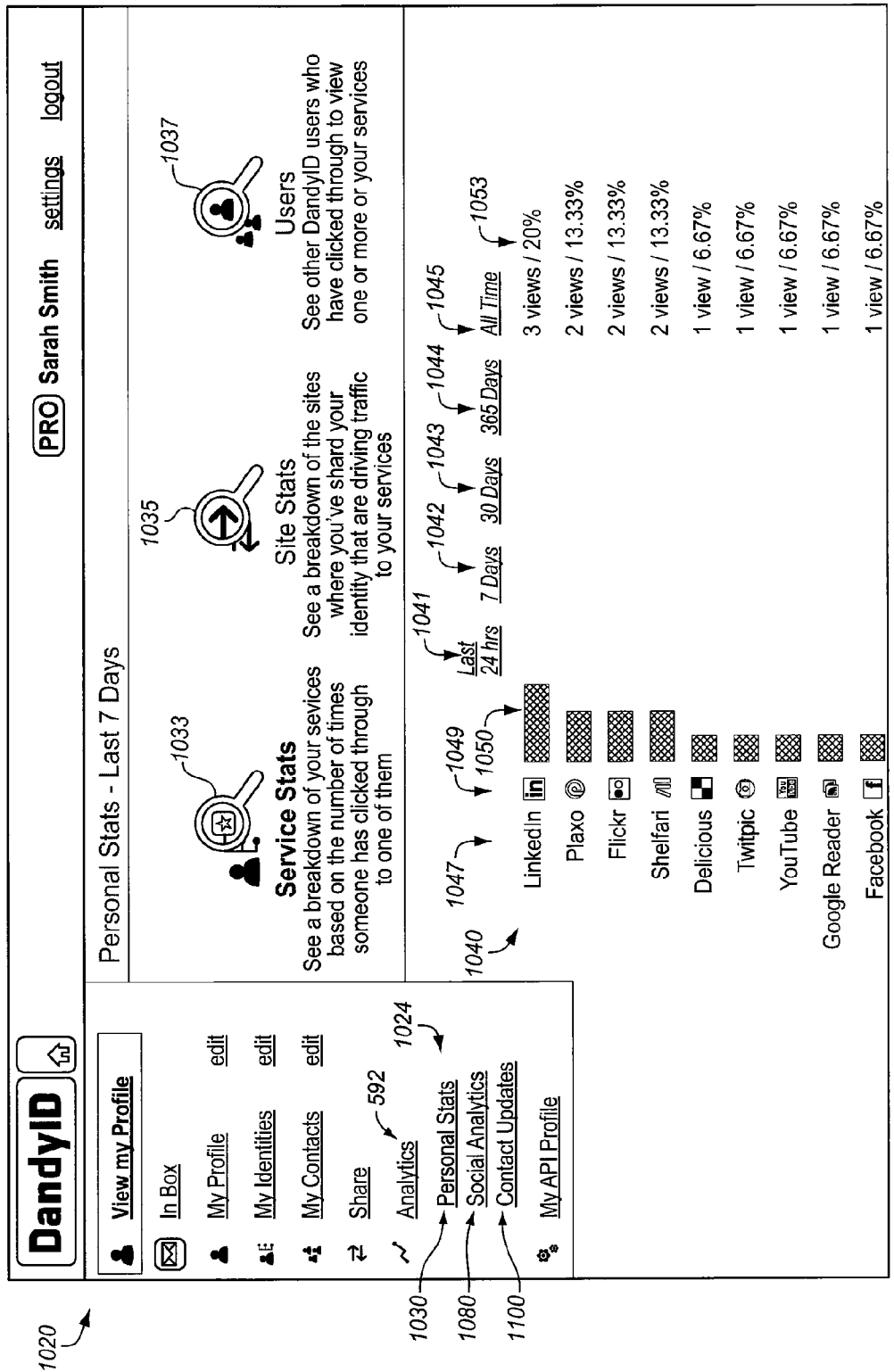
FIG. 23 illustrates a preferred embodiment according to the invention of a Personal Stats-Service Stats page or the repository.

FIG. 23 shows the Service Stats page 1020 of the system 50 according to the invention. When the Analytics button 592 is clicked on, a drop down menu 1024 appears allowing the user to navigate to a plurality of personal analytics pages. In the embodiment shown, there are three available personal analytics functions: Personal Stats 1030, Social Analytics 1080, and Contact Updates 1100. Clicking on any of the menu items 1030, 1070 and 1100 links to the corresponding pages showing the analytics. The Personal Stats analytics item 1030 links to three different analytics functions, Service Stats 1033, Site States 1035, and Users 1037. These are shown and described on Service Stats page 1020. The Service Stats analytics provides a breakdown on the number of times someone has clicked through DandyID to each of the services 570 listed on the user's profile page 550 (FIG. 13) or another site that has DandyID stats enabled tracking. These are shown at 1040 in descending order of number of views. The user may chose to see the stats for the last 24 hours by clicking on button 1041, the last seven days by clicking on button 1042, the last 30 days by clicking on button 1043, the last year by clicking on button 1044, and for all time by clicking on button 1045. In this particular view, the accesses in the last seven days has been selected. For each service, the name of the service is shown in column 1047, the icon of the service is shown in column 1049, a bar graph illustrating the number of times the service has been accessed as a percentage of total accesses via DandyID is shown in column 1050 and the total number of times/percentage in numbers is shown in column 1053 for each service. Only a partial view of the statistics is shown in FIG. 23 to conserves space.

The Site States page 1060 is shown in FIG. 24. As indicated at 1061, the Site Stats show a breakdown of the percentage of total accesses of the user's profile page that are coming from each of the web services to which the identity graph 570, 610 of the user has been ported. The percentage as a number is shown in column 1062, the percentage in the form of a bar graph is shown in column 1064, and the URL of the web service is shown in column 1066. Again, by clicking on one of the buttons in row 1068, the user can choose between the accesses in the last 24 hours, the accesses in the last seven days, the accesses in the last 30 days, and the accesses in the last 365 days. As indicated in the Site Stats, 87.5% of the accesses in the last twenty four hours have been through DandyID, 6.25% have been through Facebook, and 6.25% of the accesses have been through TheMissSmithWebsite, presumably because the user is listed there as a contact. Only a portion of site stats are shown in FIG. 24 to conserve space. The Users analytics button 1037 accesses a page which shows the other DandyID users who have clicked through to view your page on one or more of your services. This page is not shown, as its form is similar to that of FIGS. 23 and 24. On this page, each user is shown in one column, percentage of accesses via that user is shown in a bar graph, and the number of times that user has accessed one of your services as well as the numerical percentage is shown in another column.

Figure 25:
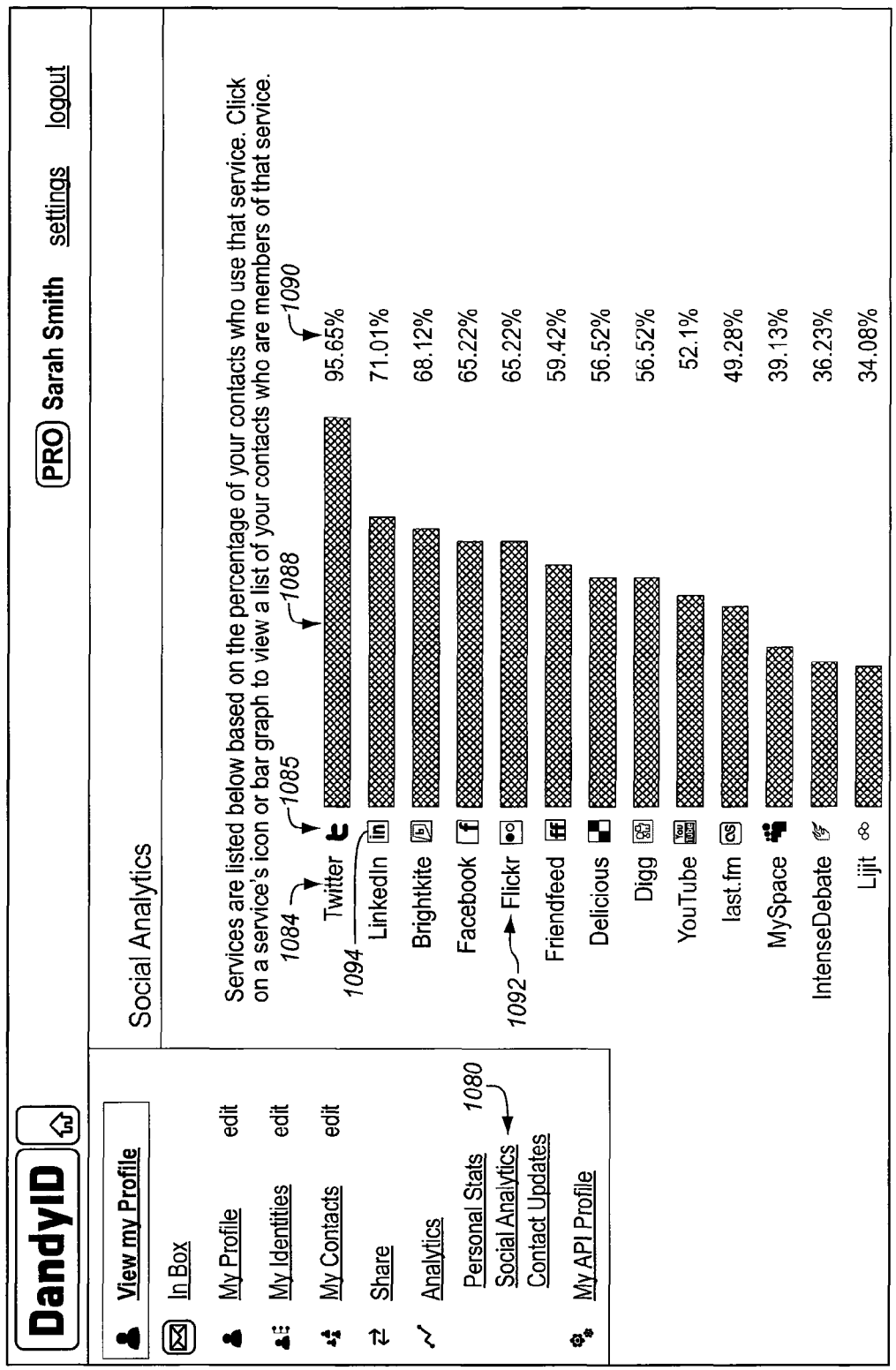
FIG. 25 illustrates a preferred embodiment according to the invention of a Social Analytics page of the repository.
Figure 27:
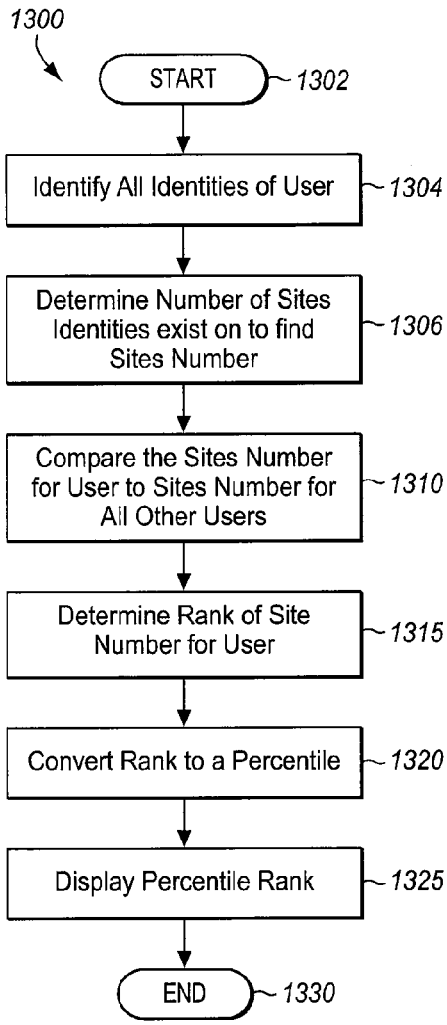
FIG. 27 is a flow chart illustrating a preferred process according to the invention for creating the Social Services Ranking result of FIG. 13.

FIG. 25 shows a portion of the Social Analytics page 1082. This page is reached by clicking on the Social Analytics button 1080. This page shows the percentage or number of the user's contacts that use each of the services associated with system 50. In this example, the name of the service is given in column 1084, the icon for the service is shown in column 1085, the percentage of the user's contacts that use the service are shown in bar graph form in column 1088 and the percentage is shown in numerical form in column 1090. For example, as shown in row 1092, 65.22% of the user's contacts also use the Flickr web site. By clicking on the site icon, the user can go to the user's contacts that use the corresponding web service. For example, by clicking on the Linkedin icon 1094, the user goes to the page 1200 shown in FIG. 26. As shown at 1204, this page shows the user's contacts that are members of Linkedin. The contacts are shown in column 1206. For each contact, a picture, such as 1210 or an icon, such as 1222 is shown. The name of the contact is shown, such as 1214, and a button, such as 1220, linking to the contacts Linkedin site is provided. FIG. 27 is a flow chart illustrating a preferred embodiment of a process 1300 for providing the Social Ranking 596 of FIG. 13. The process starts at 1302, and at 1304 all the identities of the user are determined from the identity graph 574 data. At 1306 the number of web sites, services, and applications that the user is registered on is determined and a "sites number" for that user is determined. At 1310, the sites number of this user is compared to the sites number for all other users, and at 1315 the rank or the user among the other users is determined. For example, if the user is registered on twenty sites, the user is ranked between the users who are registered on nineteen sites and the users who are registered on twenty-one sites. At 1320 this ranking is converted to a percentile ranking by counting all the users that are ranked below the user plus, dividing by the total number of users, and multiplying by 100. At 1325 the percentile rank is then displayed on the user's profile page as shown at 596 in FIG. 13, and the process ends at 1330.

Figure 28:
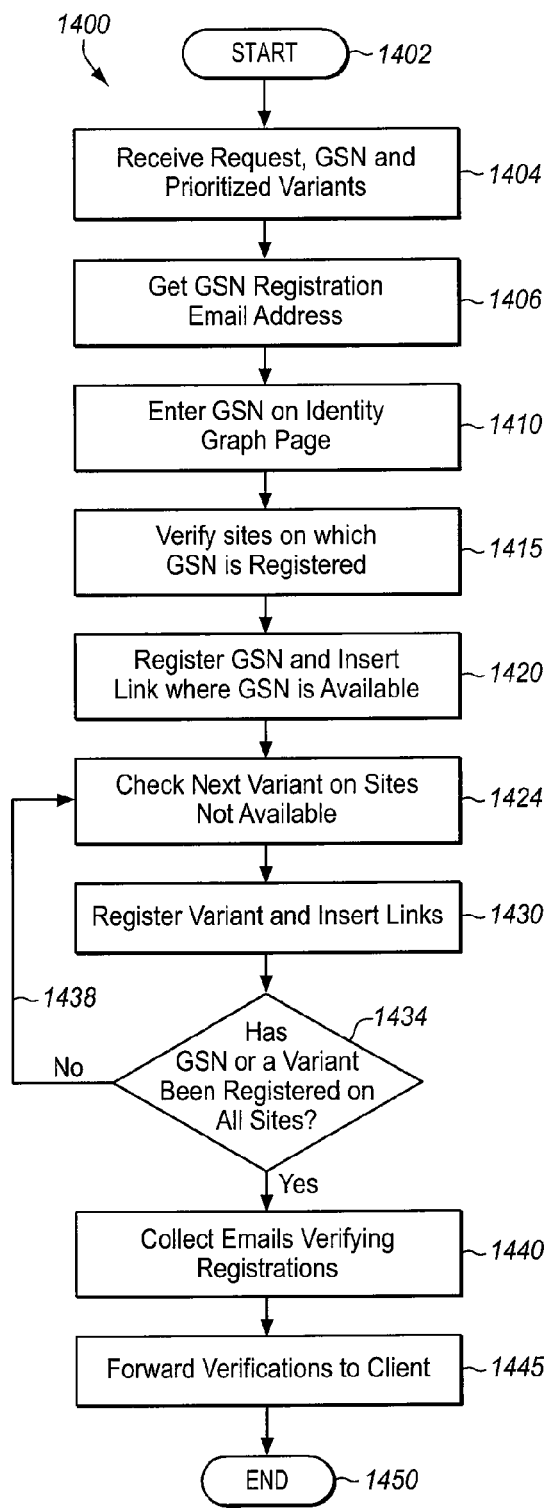
FIG. 28 is a flow chart illustrating a preferred process according to the invention for securing an internet identity across a plurality of web sites.

FIG. 28 is a flow chart illustrating several preferred embodiments of a process 1400 for registering a user's identity on a plurality of web sites, web services, and applications. This process has recently been incorporated into the web site "ClaimMyName". The process starts at 1402. At 1404, the system 50 receives a request to register a Global Social Name (GSN), the GSN and a prioritized list of variants of the GSN. The variants are used in prioritized order if the GSN is not available on any particular web site, web service, or application. At 1406, an email account is set up and an email address obtained to receive the registration information. At 1410, the GSN is entered on an identity page, such as page 430 of FIGS. 11A and 11B or a variant of the page, and the web sites on which the GSN is registered are determined. At 1415, it is verified whether the individual registrations are registrations of the user, and if not already done, a link may be inserted in each web site pointing back to the principal web site of the user, as discussed below. At 1420, the GSN is registered on all or a selected number of the available web sites, web services, and applications associated with repository 50 and, preferably, a link is inserted at each web site pointing back to the principal web site of the user, which may be the DandyID profile page or a page on which a particular trademarked product is sold. For example, if a golf product is sold on a web site called "forestgolf.com" and "Forest Golf, Inc." requests registration, then a link may be included either back to www-.forestgolf.com or www.DandyID.org/id/forestgolf, or both. As the GSN is registered, the registration verifications from the web service or application are sent to the registration email and collected at 1440. At 1424, the next variant in order of priority is entered on the identity page in the entry line for the web services or applications for which the GSN was not available; and where the variant is already taken, it is checked and verified if this is the user. At 1430, the variant is registered on the sites where it is available, and, preferably, a link inserted as described above. At 1434, whether a GSN or variant has been registered on all sites is checked, and if not, the process returns to 1424 and the process steps 1424, 1430, and 1434 are repeated. When a GSN or variant has been registered on all sites, the process proceeds to 1440, then 1445 where a registration verification summary including or based on the emails is sent to the user. The process ends at 1450. If the GSN is registerable on all web services and applications, there are no sites that were not available for the GSN, steps 1424 to 1434 are null, and the program proceeds directly to sub process 1440. The process 1400 can be ordered by a user on a recurring basis. That is, weekly, monthly, or whenever a new web service or application is added to the repository database, the steps 1410 through 1445 can be repeated to register the user ID and, preferably, create a link on the new sites. The process 1400 is particularly useful because it allows a user to own the same name on more than three hundred social media sites. This makes it easy for others to find the real user and eliminates web site squatting and other malicious behaviors. Importantly, it results in the improvement of the user's ranking on search engines. How this improvement occurs is discussed in connection with FIG. 30.

FIGS. 29A and 29B show a preferred embodiment of a web page useful for securing internet identities across a plurality of web sites. FIG. 29A shows the top of the web page and FIG. 29B shows the bottom of the web page. This is the web page for the ClaimMyName web site. The web page preferably originates from a server computer and is displayed on a client computer as known in the art. At 1452, the web page invites the user on the client computer to choose the security package desired. A choice of two packages is provided: A Starter Pack at 1453 and a "Pro Pack" at 1454. The different packages allow a user to choose to register the desired identity at different numbers of web sites. For example, the Starter Pack permits the user to register at thirty sites, while the Pro Pack registers the identity at 300 web sites or services. The web sites may be selected at 1455. The list of different web sites has been abbreviated to make the drawing smaller. Each web site is indicated by an icon, such as 1458, and the name of the site, such as 1459. A box, such as 1457, may be checked to select the web site. In the embodiment shown, thirty sites are already selected for the user, shortening the time for selection. The already selected sites may be unselected by clicking in the box, such as 1457. At 1460, the user may select the identity to be secured, or here referred to as Username. In box 1461, various notes are presented to the user. These are not shown, for reasons of brevity, but include the indication that if the first choice is not available, the system will attempt to register the second choice, and so on as indicated above. It also may be noted that some web sites, such as Amazon and Google Reader do not support vanity usernames, but assign a unique user ID. At 1462, a suggestion is given for choosing variants of the username, and spaces are provides at 1466, 1467, 1468 and 1469 to choose a username or identity and three variants.

Turning to FIG. 29B, the web page requests basic information about the user at 1470. As indicated at 1472, this information may be pulled from the DandyID user profile, and if the information is not available, the user is notified by email. Conventional user identification is entered at box 1478. At 1480, the user is provided an additional option, called Pro Pack Plus, which allows the user to add the user's website URL and biography to the three hundred web sites or services by checking box 1482. A space 1484 is provided to enter a short, one sentence biography, and a space is provided at 1486 to enter a longer biography. The URL may be entered at 1488. At 1490, legal requirements are met by requiring the user to certify that the user is the owner or authorized representative of the owner of the identifier (username) by checking box 1491, and indicating that the user has read the terms of use and privacy policy and to authorized DandyID to act on behalf of the user by checking box 1493. When all the information is provided, the user may check out by clicking on box 1495, which takes the user to a payment page.

FIG. 30 is a flow chart illustrating a preferred process 1500 according to the invention for creating linked identities on system 10 to increase search engine visibility. This process happens naturally as a result of using the calls, widgets and links discussed above, though it is useful to expressly point it out. The process starts at 1502. At 1504 a user profile page, such as 550 (FIG. 13), is prepared on the repository system 50. At 1510, calls such as described above are used to link the user profile page to the user's pages on other web sites, web services, and applications. Preferably, the XFN tag "me" or other equivalents is included in the link, which allows some search engines to know the link is to the user on other web sites. At 1518, widgets or other links to the repository user profile are created on the user's web sites on the other services, also preferably using an XFN or other tag. At 1524 the contacts feature 587 of the repository is used to create a social graph 560. At 1530, the social graph is exported to other websites with appropriate links back to the user's profile page on the repository. At 1534, the search engines find the above links. As known in the art, one criterion that search engines, such as Google™, use to place a web site in a search listing is the number of links it finds pointing to the web site. Thus, the system according to the invention is useful for increasing the user's visibility on the internet.

A feature of the invention is the manner of collecting the statistics discussed above. Preferably, all access to links available on or via the repository 50 can be normalized. That is, all links point toward a URL associated with the invention, which then redirects to the link's final destination. For example, the URL associated with the profile shown in FIG. 13 is http://www.dandyid.org/id/sara, and if a user were to access Sara's Facebook profile by clicking on the Facebook icon 576 the link would go to http://www.dandyid.org/id/sara/facebook. Thus, while the http://www.dandyid.org/id/sara site does not appear to be accessed, except for perhaps for a temporary flicker of the screen, the access actually passes through the invention before the user is directed to Sara's profile at http://www.facebook.com/saraczyzewicz. As it passes through the invention numerous statistics are collected including the date and time, the referring site, referring host, ip address, etc. It should also be noted that type of URL redirection (sometimes referred to as URL forwarding) used by the invention in this process affects the ranking of the link's final destination in popular search engines. Thus the invention provides the ability for users to explicitly manage the type of URL redirection used in the process.

FIG. 31 is a flow chart illustrating a preferred process 1600 according to the invention for porting identities or contacts to another web site. This process can be considered to be another embodiment of the "Grab the Widget" function described above, and it should be understood that the various aspects of that function can also be applied to this function. The method begins at 1602. The preferred method utilizes the "Share" button 590 (FIG. 13) to initiate the process. At 1604 the system 50 receives the share request. At 1608, a screen is opened, which screen permits the user to access another web site, while still being on the repository web site 50. The screen provides a window or other feature to permit the input of the address of the other web site. At 1612, the system receives the address of the other web site, and at 1618, the system connects to the other web sites and opens a window for the other web site within or adjacent a window showing either the identities in identity graph 574 or the contacts in social graph 560. The user then clicks on the identities or contacts he or she wants to export which sends a request to the system to port the indicated identities or contacts. The request is received at 1620 and then at 1625 the system accesses the ability to add a widget or other link on the other web site. This ability will vary from site to site. At 1630, the widget that defines the indicated identities or contacts is ported to the other website. At 1635 the user positions and saves the widget to the other web site, and the process ends at 1640.

The invention also includes a permissions page, though this is not expressly shown as it is similar to pages already discussed and will be clear from these discussions. A permissions page includes a listing, similar to 440 (FIG. 11A) of all the web services, application, and users registered with the repository management system 50. For each such entity, there are entries, preferably each under a separate column, for the user to grant specific permissions, such as the permission to share public data, the permission to share certain data, such as photographs or relationships, the permission to share private data, or only specific private data, such as email addresses. A user can grant permissions globally, globally for specific permissions, or individually. The permissions can be for within the repository web site 50, or for other web sites, either individually or globally. Permissions are preferably data specific. That is, permissions for a first piece of data may be different for a second piece of data. For example, one my restrict viewing of data on Twitter to only specific family members, while viewing of data on LinkedIn is restricted only to professional contacts. One listing, similar to 440, for web sites and applications is generated by activating a Service Permissions button, and another listing of individual users is generated by clicking a User Permissions button. Preferably, the User Permissions button activates a drop down menu with a set of alphabetic buttons, a, b, c, d, etc., each of which generates the users whose identities begin with that letter of the alphabet. Service Permissions button may also activate a drop down menu that allows selection of services either alphabetically or by service types, or both.

A feature of the invention is that it provides an identity graph and the ability for a user to manage the identity graph and makes the identity graph portable to other web sites and applications.

A related feature of the invention is that it provides an social graph and the ability for a user to manage the social graph and makes the social graph portable to other web sites and applications.

Another feature of the invention is that it permits identity and social graph discovery, autodiscovery, recording and updating.

Still another feature of the invention is that it provides an identity graph and social graph analysis and statistics package, which are also portable to different web sites.

Yet another feature of the invention is that it provides for normalization of actions and data over the social web site and applications space, particularly that space relating to identity graphs and social graphs.

There has been described a novel system and method for creation, portability, and normalization of actions and data in the social web and application space. The identity and social graphs and the openness of the system results in a highly desirable comprehensive and decentralized internet identity graph, social graph and repository management system. The system is simple, universal, and economical, without requiring any additional data entry above what normally occurs when individuals register at a web site. In fact, the system reduces the requirement for data entry since the system requires only one entry to normalize data across the entire social web space, and is able to go out and find all identities of a user if only one is known, as well as find all web sites and applications to which a target user belongs. This reduces internet traffic because one does not have to get this information by trial and error. It also reduces internet traffic in that it significantly lowers the numbers of errors in performing actions and entering data, since each user selects a preferred system. Since the user constantly uses the same form of actions and data, it is easier for the user to remember how to perform actions and the names for different types of data. A feature that significantly reduces internet traffic is that all the web sites and applications on which a user is registered can be managed from a single site. The invention has numerous other novel features and advantages. For example, the invention can be integrated into any web site at little cost or labor.

It should be understood that the particular embodiments shown in the drawings and described within this specification are for purposes of example and should not be construed to limit the invention, which will be described in the claims below. Further, it is evident that those skilled in the art may now make numerous uses and modifications of the specific embodiment described, without departing from the inventive concepts. Equivalent structures and processes may be substituted for the various structures and processes described; the subprocesses of the inventive method may, in some instances, be performed in a different order; or a variety of different structural embodiments and elements may be used. Consequently, the invention is to be construed as embracing each and every novel feature and novel combination of features present in and/or possessed by the identity and social graph repository management apparatus and methods described.

We claim:

1. A method for permitting a second internet user to discover and link to web services or applications on which a first internet user is registered, said method comprising:
   collecting a plurality of different first user internet identifiers of said first internet user, each of said different first user internet identifiers comprising a URL used by said first internet user in accessing a different web service or application;
   storing said different first user internet identifiers of said first internet user in a repository electronic memory associated with a repository server computer;
   using an identities server computer, accessing said repository electronic memory and providing on a client computer of said second internet user remote from said identities server computer, an identities display, said identities display including a representation of each of said plurality of different first user internet identifiers, each said representation providing a link to the public profile of said first user on the web service or application on which said identifier is used, wherein each of said web services or applications is not the web service or application associated with said identities server computer;
   receiving at said identities server computer an input indicating said second user has activated said link to the public profile of said first user on a selected one of said different web services or applications;
   in response to said input, connecting said client computer to said public profile of said first internet user on said selected web service or application; and
   displaying on said client computer said public profile of said first user on said selected web service or application.

2. A method as in claim 1 wherein: said providing an identities display on said client computer comprises providing a display showing a plurality of icons, each icon representing a different service or application; and said receiving an input comprises receiving a signal that said user has clicked on one of said icons.

* * * * *